US011128658B2

(12) United States Patent
Cheng et al.

(10) Patent No.: US 11,128,658 B2
(45) Date of Patent: Sep. 21, 2021

(54) CLOUD-BASED FORENSIC IP TRACEBACK

(71) Applicant: AGENCY FOR SCIENCE, TECHNOLOGY AND RESEARCH, Singapore (SG)

(72) Inventors: Long Cheng, Singapore (SG); Dinil Mon Divakaran, Singapore (SG); Wee Yong Lim, Singapore (SG); Vrizlynn Thing, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 205 days.

(21) Appl. No.: 16/087,625

(22) PCT Filed: Mar. 23, 2017

(86) PCT No.: PCT/SG2017/050149
§ 371 (c)(1),
(2) Date: Sep. 21, 2018

(87) PCT Pub. No.: WO2017/164820
PCT Pub. Date: Sep. 28, 2017

(65) Prior Publication Data
US 2019/0104151 A1    Apr. 4, 2019

(30) Foreign Application Priority Data

Mar. 23, 2016  (SG) .......................... 10201602280X

(51) Int. Cl.
*H04L 29/06* (2006.01)
*G06F 21/62* (2013.01)
*H04L 9/32* (2006.01)
(Continued)

(52) U.S. Cl.
CPC ...... *H04L 63/1458* (2013.01); *G06F 21/6218* (2013.01); *H04L 9/3213* (2013.01);
(Continued)

(58) Field of Classification Search
CPC . H04L 63/1458; H04L 9/3213; H04L 41/142; H04L 43/026; H04L 63/1425; H04L 2463/146; G06F 21/6218
See application file for complete search history.

(56) References Cited

U.S. PATENT DOCUMENTS 9,060,019 B2 * 6/2015 Belenky .............. H04L 63/1458
2003/0172289 A1 9/2003 Soppera
(Continued)

OTHER PUBLICATIONS

Paruchuri, Vamsi, et al. "Authenticated autonomous system traceback." 18th International Conference on Advanced Information Networking and Applications, 2004. AINA 2004.. vol. 1. IEEE, 2004. (Year: 2004).*

(Continued)

*Primary Examiner* — Shawnchoy Rahman
(74) *Attorney, Agent, or Firm* — Womble Bond Dickinson (US) LLP

(57) ABSTRACT

A method for IP traceback is provided comprising receiving a traceback request including the identity of a traceback-deployed autonomous system closest to the destination node in a network routing path, recursively querying a traceback server associated with the traceback-deployed autonomous system to receive the identity of a preceding traceback-deployed autonomous system in the network routing path, and determining the network routing path based on the received identities of traceback-deployed autonomous systems. Additionally, authentication for traceback request is achieved using token delivery, wherein token is fragmented and marking of a packet is performed when a field on the packet matches at least one token fragment.

7 Claims, 17 Drawing Sheets

(51) Int. Cl.
H04L 12/24 (2006.01)
H04L 12/26 (2006.01)
(52) U.S. Cl.
CPC .......... *H04L 41/142* (2013.01); *H04L 43/026* (2013.01); *H04L 63/1425* (2013.01); *G06F 2221/2101* (2013.01); *H04L 2463/146* (2013.01)

(56) References Cited

U.S. PATENT DOCUMENTS

| | | | | |
|---|---|---|---|---|
| 2004/0093521 | A1* | 5/2004 | Hamadeh | H04L 69/161 726/22 |
| 2005/0044208 | A1 | 2/2005 | Jones et al. | |
| 2005/0278779 | A1 | 12/2005 | Koppel et al. | |
| 2007/0206605 | A1* | 9/2007 | Ansari | H04L 45/745 370/395.5 |
| 2008/0028467 | A1* | 1/2008 | Kommareddy | H04L 63/1458 726/23 |

OTHER PUBLICATIONS

Korkmaz, Turgay, et al. "Single packet IP traceback in AS-level partial deployment scenario." International Journal of Security and Networks 2.1-2 (2007): 95-108. (Year: 2007).*

Demir, Omer, Bilal Khan, and Ala Al-Fuqaha. "Reconstruction of malicious internet flows." Proceedings of the 6th International Wireless Communications and Mobile Computing Conference. 2010. (Year: 2010).*

PCT International Search Report for PCT Counterpart Application No. PCT/SG2017/050149, 7 pgs. (dated Jun. 17, 2017).

PCT Written Opinion of the International Searching Authority for PCT Counterpart Application No. PCT/SG2017/050149, 8 pgs. (dated Jun. 17, 2017).

Introduction to Cisco IOS NetFlow (White Paper), https://www.cisco.com/c/en/us/products/collateral/ios-nx-os-software/ios-netflow/prod_white_paper0900aecd80406232.html, 16 pgs. (May 29, 2012).

P. Ananthi, et al., "Two Level Authentication and Packet Marking Mechanism for Defending against DoS and DDoS attacks," International Journal of Computer Applications, vol. 63, No. 7, pp. 41-45 (Feb. 28, 2013).

Michael T. Goodrich, "Efficient packet marking for Large-Scale IP Traceback," Proceedings of the $9^{th}$ ACM Conference on Computer and Communications Security, pp. 117-126 (Nov. 22, 2002).

Long Cheng, et al., "A Framework for Authentication in Cloud-Based IP Traceback," IEEE Transactions on Information Forensics and Security, vol. 12, No. 3, pp. 604-616 (Nov. 3, 2016).

* cited by examiner

Input: Token fragments $TF_i$, $i \in [0, n-1]$
Output: Marked packets

1    $remainingBits_i \leftarrow TF_i$; $i \in [0, n-1]$
2    while ConciseMarking(*Packet* P) do
3       $Checksum$ = getIPChecksum(P);
4       $upperChecksum$ = ($Checksum$ & 0xFF00) >> 8;
5       $mark \leftarrow 0$;
6       for $i=0$ to $n-1$ do
7          if ConciseMatch ($upperChecksum$, $TF_i$, &$remainingBits_i$) then
8             $mark$ |= (1 << (8-i)); //8-bit marking space
9          end
10       end
11       if $mark \neq 0$ then
12          MarkPacket (P, $mark$);
13       end
14       if $\forall i, remainingBits_i == 0$ then
15          break;
16       end
17 end

Algorithm 1: Concise Marking-based Token Delivery

```
1  Function: bool ConciseMatch(value, TF,
   *remainingBits)
2  if (value ⊕ key) & value == 0 then
3  |   return false;
4  end
5  completedBits = (TF ⊕ *remainingBits);
6  newBits = value & (~ completedBits);
7  if newBits == 0 then
8  |   return false;
9  end
10 *remainingBits = (*remainingBits ⊕ value) & (~
   completedBits) ;
11 return true;
```

FIG. 9

CLOUD-BASED FORENSIC IP TRACEBACK

CROSS-REFERENCE TO RELATED APPLICATION(S)

This patent application is a U.S. National Phase Application under 35 U.S.C. § 371 of International Application No. PCT/SG2017/050149, filed on 23 Mar. 2017, entitled CLOUD-BASED FORENSIC IP TRACEBACK, which claims the benefit of Singapore Patent Application No. 10201602280X, entitled "CLOUD-BASED FORENSIC IP TRACEBACK" and filed on Mar. 23, 2016, which was expressly incorporated by reference herein in its entirety.

TECHNICAL FIELD

Various aspects of this disclosure generally relate to cybersecurity, and more particularly, to Internet Protocol (IP) traceback.

BACKGROUND

IP traceback is an effective solution to identify the sources of packets and the paths followed by the packets. IP traceback was originally motivated for tracing back network intruders with spoofed IP addresses, e.g., to defend against Internet denial-of-service (DoS) attacks. IP traceback technique can assist other IP spoofing countermeasures such as intrusion detection and packet filtering, to mitigate the attack effects. For instance, DoS attacks can be mitigated if they can be first detected, then traced back to their origins, and finally blocked at entry points. IP traceback is also useful for a wide range of practical applications, including network forensics, security auditing, network fault diagnosis, performance testing, and path validation.

Despite years of effort and billions of dollars spent annually, there have been an increasing number of cyberattacks. Many cyberattacks use source IP address spoofing to conceal the true source of an attack. In many instances, the attack effects can be mitigated if the spoofed source IP addresses are traced back to their actual origins. This allows isolating compromised hosts and domains from the rest of the network or issuing penalties to the offending party. A common solution to identify the sources of attack packets is IP traceback. While there have been many efforts on designing different IP traceback techniques, due to limited administrative access to routers and attacks that last a short duration, tracing spoofed IP packets back to the actual source is still an open and challenging problem.

Forensic IP traceback is a way to investigate network traffic a posteriori, to collect sufficient evidence so as to identify the actual source of attack packets as well as routing path taken in the network, with the objective of making the attackers accountable. For example, in DoS attacks, victims may take legal actions against the attackers or take other actions (e.g., request upstream Internet service providers to deploy packet filters) using the evidence collected through the forensic IP traceback process. Law enforcement may also greatly benefit from forensic IP traceback mechanisms. Forensic IP traceback may provide deterrence to risk-averse individuals, thus potentially reducing cyberattacks. In the event of a false accusation, forensic IP traceback may also provide the proof of innocence by showing that the packets propagated to the victim does not actually originate from the innocent sources. In addition, forensic IP traceback may be used for a wide range of non-adversarial network analysis applications, such as traffic accounting, security auditing, fault diagnosis, and path validation.

There are several challenges hindering the widespread acceptance of IP traceback techniques. One reason is the Internet service provider's (ISP's) security concern of disclosing the network topologies. Traditional packet marking based IP traceback approaches send marking information to the victim (e.g., a network node outside the ISP's network domains), thus having the risk of disclosing the details of the ISP's networks. Another main reason is the lack of properties favoring incremental deployment, an essential component in adopting IP traceback by ISPs. In addition, existing IP traceback mechanisms are inadequate in providing economic incentives for ISPs to deploy traceback in their networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for IP traceback are provided. The apparatus may be a traceback coordinator. The apparatus may receive a traceback request including the identity of a traceback-deployed autonomous system closest to the destination node in a network routing path. The apparatus may recursively query a traceback server associated with the traceback-deployed autonomous system to receive the identity of a preceding traceback-deployed autonomous system in the network routing path. The traceback server associated with the preceding traceback-deployed autonomous system is to be queried in the next iteration of the recursively querying. The apparatus may terminate the recursively querying when there is no matched traceback record on the traceback server being queried or the traceback server being queried identifies the associated traceback-deployed autonomous system as being closest to the source node in the network routing path. The apparatus may determine the network routing path based on the received identities of traceback-deployed autonomous systems.

In another aspect of the disclosure, a method, a computer-readable medium, and an apparatus for IP traceback are provided. The apparatus may be a traceback-enabled router. The apparatus may receive a traffic flow that is to leave a first autonomous system in which the apparatus resides. The apparatus may mark the traffic flow with the identity of the first autonomous system. The apparatus may transmit the marked traffic flow to a second autonomous system. The apparatus may further collect information associated with the traffic flow. The apparatus may export the information associated with the traffic flow to a cloud storage managed by the traceback server associated with the first autonomous system.

In yet another aspect of the disclosure, a method, a computer-readable medium, and an apparatus for delivering an access token for IP traceback to a traceback client are provided. The apparatus may be a last-hop router in a network routing path to the traceback client. The apparatus may partition a token into a sequence of token fragments.

The apparatus may determine whether a field of a packet matches at least one token fragment of the sequence of token fragments. The apparatus may mark the packet to indicate the packet carrying partial information of the token when the field of the packet matches at least one token fragment of the sequence of token fragments. The apparatus may deliver the marked packet to the traceback client, which may extract the partial information of the token from the marked packet. The traceback client may reconstruct the token based on a collection of partial information of the token extracted from a plurality of marked packets.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a diagram describing an algorithm with regard to the concise marking-based token delivery in one embodiment.

FIG. 9 is a diagram describing the function of checking concise token fragment match.

DETAILED DESCRIPTION

Figure 1:
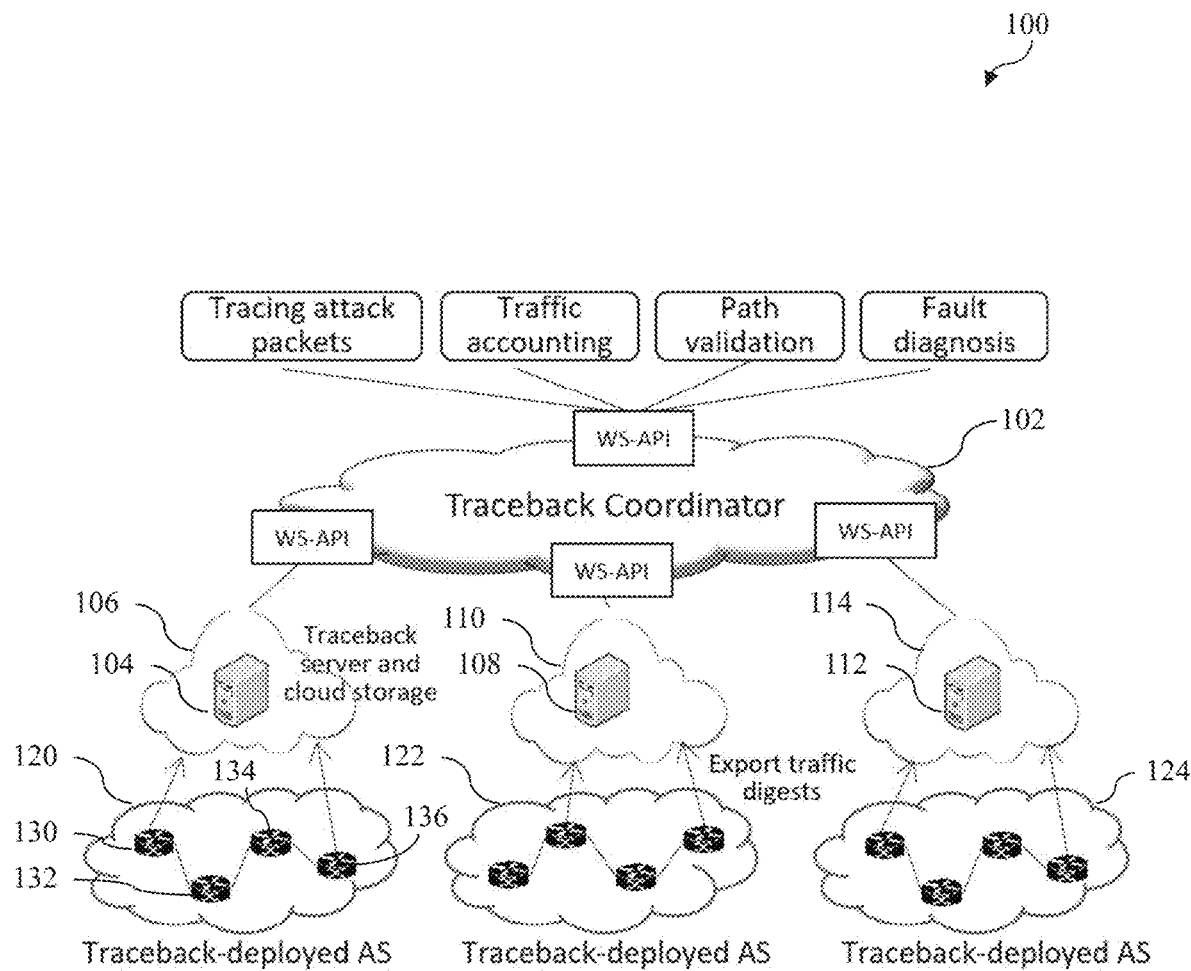
FIG. 1 is a diagram illustrates an overview of an example of a cloud-based forensic IP traceback architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computing systems for cybersecurity will now be presented with reference to various apparatus and methods. The apparatus and methods will be described in the following detailed description and illustrated in the accompanying drawings by various blocks, components, circuits, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The recent advent of cloud computing paradigm may offer new, most likely better, options for IP traceback practical deployment. With the advancement of distributed file system, ISPs start to offer cloud storage service where files are stored in ISP's local data centers. In one embodiment, with a proper access control mechanism, cloud-based IP traceback may alleviate ISP's privacy concerns of disclosing the internal network topology. Cloud-based IP traceback of one embodiment may also support incremental deployment. Furthermore, the pay-per-use nature of cloud based service may provide incentives for the ISPs to deploy IP traceback service in their networks. Therefore, in one embodiment, cloud infrastructures may be exploited for large-scale forensic IP traceback service.

Traditional IP traceback techniques may be broadly classified into three categories: logging-based, marking-based, and hybrid approaches. In logging-based IP traceback schemes, routers store information locally such as digests or signatures of passing packets. The traceback process is conducted in a hop-by-hop fashion requiring a query at each router on the path. In a conventional example of a hash-based technique, IP traceback generates audit trails for traffic within the network. Packet digests are computed based on the invariant portions of the IP header and the first 8 bytes of the payload, and then stored in Bloom filter-based digest tables on each router. Apparently, the major challenge in traditional logging-based traceback is the significant storage space requirement and high processing overhead at intermediate routers. To reduce the storage requirement for logging-based traceback, flow level logging may be introduced to sample and log only a small percentage of packets, which requires much smaller processing and storage cost. Therefore, flow digests may be recorded instead of logging individual packets for IP traceback.

In marking-based IP traceback approaches, some or all routers may embed partial path information into IP packet headers when the packets traverse through a network. The destination (e.g., the victim) may use the marking information in multiple packets to reconstruct the routing path or source address of a packet stream. Compared with traditional logging-based IP traceback approaches, marking-based IP traceback imposes little computation and storage overhead on routers. According to the marking decision made at the routers, marking-based traceback may further be divided into deterministic packet marking and probabilistic packet marking. In deterministic packet marking, edge routers mark every outbound packet. For example, in a conventional deterministic packet marking, ingress edge routers may embed their IP address into packets in a deterministic manner. In probabilistic packet marking, routers may mark passing packets with their identity information based on a probability measure. In a conventional probabilistic packet marking method, a router may probabilistically mark packets with router's identity (e.g., IP address of the router). As packets traverse two connected routers through the Internet, the packets may be probabilistically marked with the edge information of the two connected routers. Several other conventional marking-based methods may reveal that an inherent tradeoff exists in probabilistic packet marking between the number of header bits used and the number of packets required to reconstruct the attack path. Probabilistic packet marking based approaches may be able to reconstruct the attack path after receiving a sufficient number of marked packets at the end-host, and may generate false positives. The goal of deterministic packet marking may be to locate the attack source, while the main purpose of probabilistic packet marking may be to identify the attack path.

Hybrid traceback approaches integrate the concepts of packet marking and logging. There are two conventional hybrid traceback schemes, distributed linklist traceback and probabilistic pipelined packet marking. The objective of hybrid traceback may be to reduce the number of packets needed for constructing attack paths in probabilistic packet marking by allowing packets marking field temporarily logged on routers.

There are attempts to use packet marking to reduce the overhead of logging-based IP traceback by recursively marking the accumulated information of multiple routers on packets, and logging the accumulated path information at some of the routers on the path. Nevertheless, these attempts require large marking field per packet and high storage on logged routers, since the logging is performed on a per-packet basis. A conventional hybrid IP traceback scheme was introduced to reduce the marking space requirement per packet. Since the marking space on each packet is limited, packet-marking scheme logs the marking field into a hash table and marks the hash table index on the packet. Thereafter, the victim may reverse such process to trace back to the origin of attack packets. Since most IP traceback techniques require active participation of routers in the network, ISPs are positioned to play a vital role in the practical deployment of traceback systems. From the perspective of ISPs, privacy preserving, incremental deployability, and financial motivation are important issues for a practically viable IP traceback solution.

In privacy preserving, the main challenge hindering the practical deployment of traceback technique is ISPs' security concern regarding possible disclosure of their network topologies. Disclosure of ISPs' network topologies may expose potential vulnerabilities to attackers who may target bottlenecks in the network. As a result, ISPs may not wish to participate if the deployment of trackback technology could cause the leakage of network topology information to potential attackers or competitors.

Marking-based traceback may cause such sensitive information to be conveyed to parties outside of the ISP, since the path reconstruction procedure is executed on the end-host. For example, even marking is the cryptographic hash of the router's IP address, the end-host may reconstruct upstream router maps of the network based on received packets with marking values. Thereafter, the marking-based traceback method may use the reconstructed router maps to perform IP traceback. However, such router maps are normally considered commercially sensitive information towards ISPs, and an adversary may misuse traceback techniques for ISPs topology discovery. Logging-based traceback, where the traffic information is logged either on routers or traceback servers locally, has better privacy-preserving properties compared with the marking-based approach. However, logging-based traceback may suffer from potential information leakage vulnerability if without a proper traceback request authentication mechanism.

Incremental deployability is important for a viable IP traceback solution, since it is unrealistic to expect all ISPs to begin to deploy IP traceback services at the same time. An incrementally deployable traceback mechanism may need to have the following three properties:

i. Partial deployment: the traceback mechanism functions even when partially deployed across routers in the Internet.

ii. Initial benefit: if a traceback scheme does not provide benefits for early adopters, an ISP would have no incentive to start deployment.

iii. Incremental benefit: the traceback mechanism provides incremental benefits for adopters, and such benefits may increase substantially as deployment proceeds.

Incremental deployability and deployment incentives may be closely coupled. An incrementally deployable IP traceback solution may need to be not only technically sound but also economically acceptable. For most marking-based traceback solutions, path reconstructions are done at victims. Since the marking information embedded in packets can pass through legacy routers and eventually arrives at the destination, theoretically, victims can reconstruct incomplete paths back to attackers under partial deployment of traceback-enabled routers. However, partial deployment for marking-based traceback solutions may increase false positives in identifying traceback-enabled routers. Logging-based traceback approaches may lack properties favoring incremental deployment. In the event that tracing is conducted in a hop-by-hop (or level-by-level) manner, logging-based traceback approaches recursively query individual upstream routers along the attack path. In such case, the traceback process in logging-based approaches may halt prematurely when encountering a legacy router along the reverse path of attack packets. In one embodiment, the traceback server of each autonomous system (AS) maintains a global knowledge of all other traceback-deployed ASes. Upon receipt of traceback request, the current traceback server first sends queries to its level-1 traceback-deployed AS neighbors. If the attack path cannot be reconstructed, the current traceback server sends queries to its level-2 traceback-deployed AS neighbors (2-hop away from the current AS), and so on. Such traceback process suffers high communication overhead and low scalability.

The financial motivations for deployment of traditional marking-based traceback are structured in an awkward fashion. An ISP that deploys marking-based traceback does not benefit the customers of the ISP directly, but it protects other ISPs customers. Conventional methods address this issue by restricting packet marking information to only paid customers based a subscription charging model. That is, each AS that deploys the traceback service charges a fee to its customers (networks or end users) who are interested in accessing to the service. Thus, only paying customers can get the marking information. Obviously, the pay-as-you-go charging model is more attractive to users because in many instances, customers only need traceback services after they have been attacked.

Logging-based traceback approach may adopt a hierarchical system architecture, where a traceback server controls the traceback in its domain (e.g., AS). For example, a logging-based traceback approach may build an AS-level overlay network among traceback-deployed ASes, where a traceback server and multiple traffic log collectors are deployed in each AS. Such hierarchical system architecture facilitates the implementation of the pay-as-you-go charging model in a traceback system.

Existing hybrid traceback approaches may be grouped into either logging-assisted marking or marking-assisted logging. Therefore, hybrid traceback also suffers similar privacy and incremental deployment issues of non-hybrid approach. Despite the rich literature on IP traceback, current IP traceback solutions do not satisfy all the three favorable properties from the perspective of ISPs. There is a desire to present a traceback design that possesses these properties simultaneously.

Packet logging was considered as an unrealistic approach when it was proposed due to large storage requirement for packet logs. However, technology advancement has increased the feasibility of logging-based solutions over time. Flow-level logging has attracted increased attention as Internet routers are becoming more powerful. Nowadays, network operators routinely collect flow-level measurements for many critical network management applications. For example, NetFlow, sampled flow (sFlow) and Internet Protocol Flow Information Export (IPFIX) are increasingly being deployed with applications that range from customer accounting, identification of unwanted traffic, anomaly detection, to network forensic analysis. Consequently, flow-level logging-based traceback becomes a promising traceback solution.

In traditional logging-based approaches, traceback logs are stored locally at routers for some period of time, depending on the resource dedicated to the storage at the router. Consequently, traceback may need to be initiated before the corresponding log tables are overwritten, which is inadequate in supporting forensic traceback. Therefore, in one embodiment, increasingly available cloud infrastructures are exploited for logging the traffic digests for forensic traceback.

FIG. 1 is a diagram illustrates an overview of an example of a cloud-based forensic IP traceback architecture 100. In the example, traditional flow-level logging-based traceback may be migrated to cloud-based computing environment. The cloud-based forensic IP traceback architecture 100 may include a hierarchical structure which is organized in three layers, the central traceback coordinator layer, AS-level traceback server layer (i.e., the overlay layer), and AS-level router layer (i.e., the underlying network layer). The central traceback coordinator layer may include a traceback coordinator 102. The AS-level traceback server layer may include traceback servers 104, 108, 112, and their corresponding cloud storages 106, 110, 114, respectively. The AS-level router layer may include routers for traceback-deployed ASes 120, 122, and 124.

In one embodiment, a traceback server may be deployed in each traceback-deployed AS. Traffic flow information collected at traceback-enabled routers (e.g., traceback-enabled routers 130, 132, 134, 136) may be exported to internal cloud storage (e.g., the cloud storage 106), which is managed by the traceback server (e.g., the traceback server 104) in each AS for long-term storage and analysis. Different traffic sampling techniques may be applied to improve the overall fidelity of flow-level measurements. Routers may independently sample the traffic or collect the traffic flow in a coordinated fashion. Flow-level traffic digests may contain the following information: source IP address, destination IP address, source port, destination port, protocol, timestamp, etc. Data aggregation may be performed at the traceback server. Since the traceback server, as well as internal cloud storage is managed by local AS, sensitive information may be adequately maintained and guarded. Thus, cloud-based traceback may have the potential to offer stronger privacy-preserving guarantee.

In one embodiment, traceback-enabled ASes (e.g., the ASes 120, 122, 124) may expose their traceback services in the traceback coordinator 102, e.g., by publishing traceback services in standard form using the web service (WS) technology (e.g., WS-API). The published traceback service may be accessible as a charged service to network forensic investigators (e.g., victims, network administrators, or law enforcement agencies) and other applications, as shown in FIG. 1. The traceback coordinator 102 is the central point/portal of access into the system. The traceback coordinator 102 may function mainly as a querying hub without storing any traceback data. In one embodiment, the traceback coordinator 102 may retrieve logs from individual traceback servers when requested and authenticated.

In one embodiment, the traceback procedure may start with an investigator sending queries to the traceback coordinator 102. Suppose a user starts a traceback request consisting of the 5-tuple flow ID (source IP, destination IP, source port, destination port, protocol) and the estimated attack time. The traceback coordinator 102 may first contact the traceback server of the last traceback-deployed AS that the flow of interest traverses. In one embodiment, the traceback server of the last traceback-deployed AS may be responsible for the authentication of the traceback request. Upon verification, retrieved results will be returned from corresponding traceback servers that witnessed the flow of interest. A marking scheme for efficient traceback query processing will be described below with reference to FIG. 2. Each traceback server may generate an attack graph for its local domain. Note that the flexibility of the scheme rests with the ISP. For example, the granularity of an attack graph may be controlled by each individual traceback server to avoid the sensitive information leakage. Then, attack graphs from each AS may be assembled together to form a complete attack graph by the traceback coordinator 102.

Given the promise of cloud computing with reduced infrastructure costs, ease of management, high flexibility and scalability, deploying traceback service in cloud not only meets several favorable properties previously identified, but also presents new opportunities. Such a centralized system may simplify the traceback processing and address the technical and economic challenges for the practical deployment of an IP traceback system.

The main advantages of cloud-based traceback are as follows.

- The cloud architecture may make a traceback system incrementally deployable without much extra effort, providing a progressive traceback solution.
- Cloud-based traceback may have the potential to offer stronger privacy-preserving guarantees. With each ISP handling their individual traceback servers independently, their privacy and autonomy may be adequately maintained.
- Cloud-based traceback shows stronger immunity to attacks. Cloud-based traceback is robust against the tampering by the attackers, without resorting to cryptographic techniques. For example, it is possible the central server (e.g., the traceback coordinator 102) checks any routing inconsistencies and figures out compromised routers or corrupted information. While in marking-based approach, there exist such issues that compromised routers pass spoofed marking information or erase marking information to misdirect the traceback procedure. Similarly, in traditional logging-based approach, the hop-by-hop traceback process is also vulnerable to compromised routers.
- Cloud-based traceback architecture enables forensic investigations in the aftermath of attacks, even several logged days prior.
- The pay-by-use nature of cloud service encourages ISPs' involvement to deploy the traceback service, where the traceback coordinator (e.g., the traceback coordinator 102) may distribute monetary rewards to traceback deployers.

In addition, embodiments of the cloud-based traceback architecture 100 resonate highly with the software-defined networking (SDN), which is an emerging paradigm that decouples networks control plane and data plane physically. SDN offers a centralized view of the network in each AS, and shows similarities with the cloud-based traceback architecture 100. Since SDN architecture provides more customized and flexible traffic flow measurement and routers regularly send collected flow statistics to the controller, embodiments of the cloud-based traceback may be integrated into SDN with ease.

In one embodiment, a marking scheme running at AS-level border routers may be introduced. The marking scheme may improve traceback processing performance and facilitate incremental deployment over the state-of-the-art traceback protocols. In such an embodiment, a flow-level marking may be introduced at border routers, which achieves efficient traceback processing and incremental deployability. The key idea of the marking scheme is to add an extra attribute to flow logs to indicate the immediate upstream traceback-deployed AS that the packet flow has been progressed from. In this way, logical links may be built among the traceback-deployed ASes, so that during the traceback process, a downstream AS may be able to know the next AS that should be contacted for tracing the flow. In this example, a border router may mark its AS identity (ID) (e.g., the global unique 16-bit AS number or internal assigned ID), on flows that leave from the AS to another AS. The flow marking may mark every flow (e.g., mark the first few packets of a flow), instead of every packet. A flow in this context may be defined as a unidirectional sequence of packets between two endpoints that have a common flow ID with no more than a specific inter-packet delay time.

Figure 2:
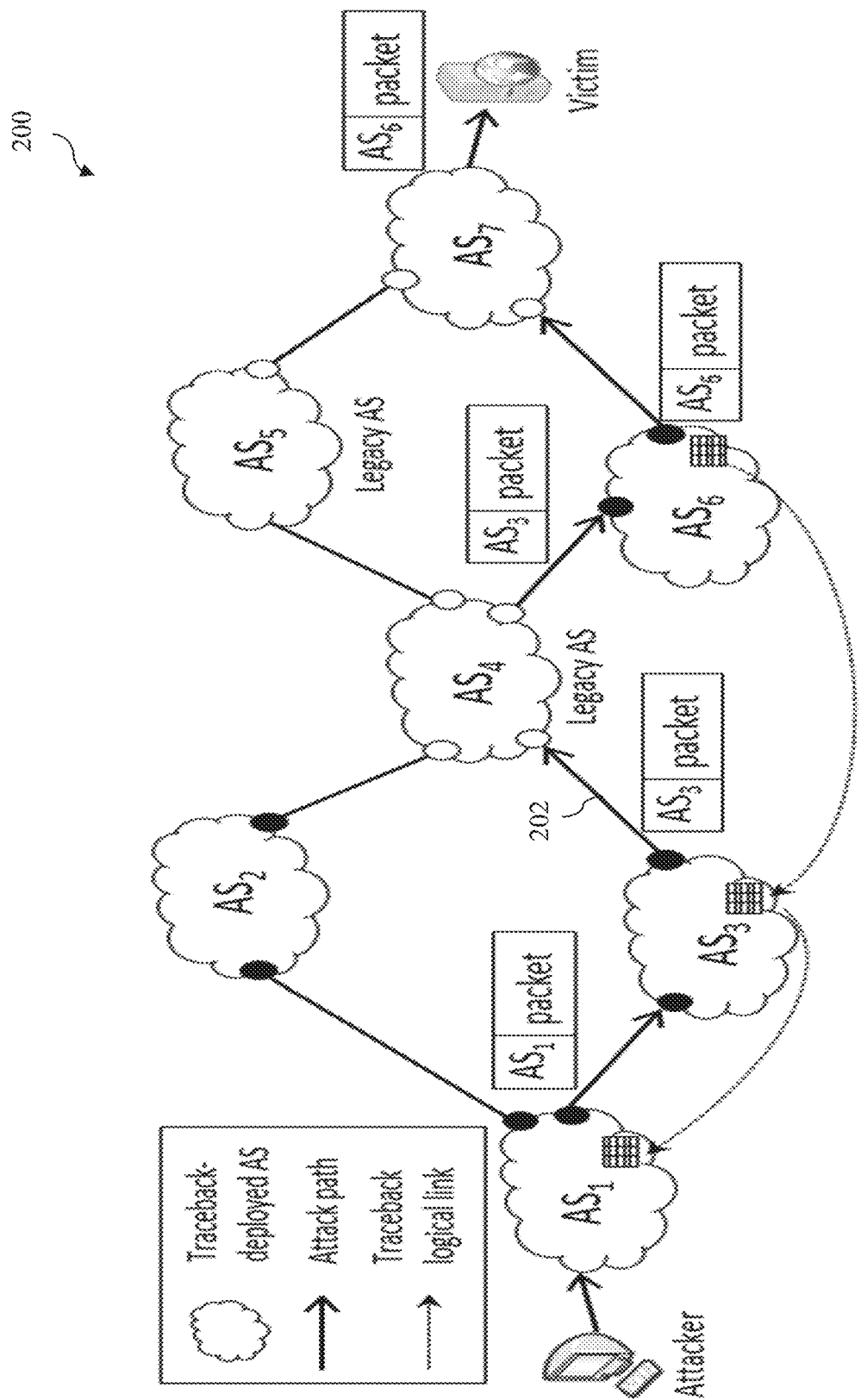
FIG. 2 is a diagram illustrating an example of the marking scheme running at the border routers.

FIG. 2 is a diagram 200 illustrating an example of the marking scheme running at the border routers. In this example, $AS_4$ and $AS_5$ are legacy ASes, and the others (e.g., $AS_1$, $AS_2$, $AS_3$, $AS_6$, and $AS_7$) are traceback-deployed ASes. Assume an attack flow 202 traverses through $[AS_1 \rightarrow AS_3 \rightarrow AS_4 \rightarrow AS_6 \rightarrow AS_7]$. When the border router in $AS_1$ receives a packet in the attack flow 202 from its local AS and forwards the packet to $AS_3$, the border router in $AS_1$ may mark the local AS number (e.g., identity of $AS_1$) in the packet's IP header. When the packet is forwarded by routers in $AS_3$, the upstream traceback-deployed AS information may be recorded in the flow report. Since flow marking is transparent to legacy routers/ASes, the scheme works well in partial deployment situations. For example, in FIG. 2, even though the packet flow from $AS_3$ passes through $AS_4$ before reaching AS6, the marking on the packet (e.g., the identity of $AS_3$) does not change as $AS_4$ is a legacy AS. Therefore, $AS_6$ may be able to know that the packet flow comes (directly or indirectly) from $AS_3$. Note that once a packet has been marked by a border router (e.g., the corresponding marking field in IP packet header has non-zero values), the downstream ASes may mark this packet deterministically. As a result, the marking information of previous AS will be overwritten by the downstream AS. Hence, this marking scheme protects AS' privacy from end-hosts.

With the introduction of flow-level marking at border routers, it may be possible to achieve efficient query procedure without the need of broadcasting the query. It may also allow ISPs to incrementally deploy the traceback enabled routers, to provide a modest and progressive traceback solution.

Figure 3:
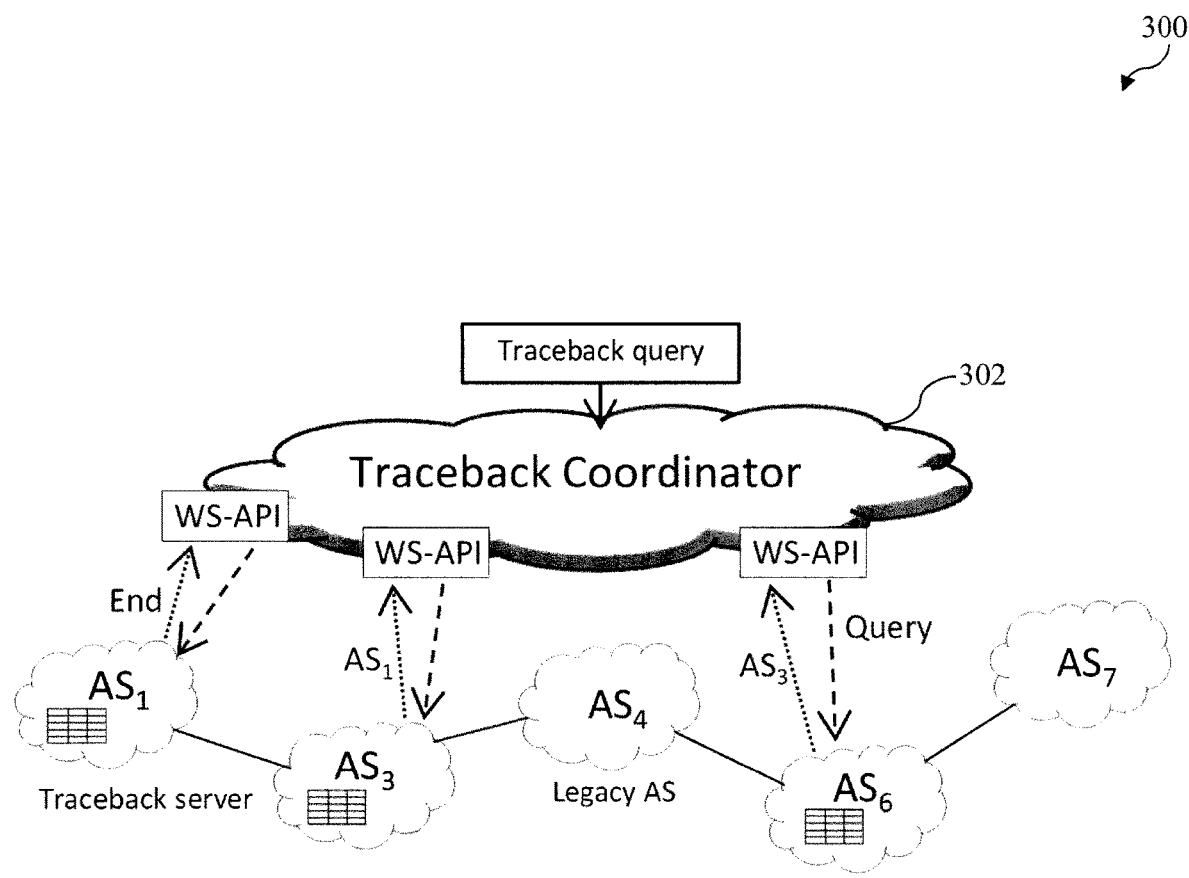
FIG. 3 is a diagram illustrating an example of cloud-based traceback query processing.

FIG. 3 is a diagram 300 illustrating an example of cloud-based traceback query processing. To be generally applicable to partial deployment scenarios, it is not assumed that the victim's local AS has been deployed traceback mechanism in this example. The border router marking scheme described above with reference to FIG. 2 may permit the victim to extract the identity information of its closest traceback-deployed AS on the attack path. When a traceback request is launched, the traceback coordinator may send a query to the last traceback-deployed AS (e.g., the closest traceback-deployed AS to the victim). For example, in FIG. 3, the traceback coordinator 302 may first query $AS_6$ traceback server, as $AS_6$ may be the closest traceback-deployed AS to the victim, which is located at $AS_7$. If there is any matched traceback record in $AS_6$, an acknowledgement, as well as the next traceback-deployed AS information (e.g., $AS_3$ information) that forwarded the flow of interest may be returned to the traceback coordinator 302. In the next step, the traceback coordinator 302 may send a new traceback query to $AS_3$, and may identify the next traceback-deployed AS (e.g., $AS_1$). When there is no matched traceback record or a traceback server identifies itself as the first traceback-deployed AS (e.g., the closest traceback-deployed AS to the attacker) on the attack path, the traceback coordinator 302 may terminate the recursive query process, and return the constructed AS-level attack graph to the traceback requester.

In the context of cloud-based traceback based on the various embodiments described above, suppose a malicious entity has access to the cloud-based traceback service, and can retrieve recordings from the corresponding traceback server. On one hand, there exists a risk that a misbehaving user derives the ISP's network topology after collecting sufficient traceback results. On the other hand, malicious users may launch denial of service (DoS) attacks against the traceback service. In addition, it is important to protect legal Internet users' privacy since they normally do not want to be traced. Therefore, any entity wishing to perform a traceback may need to be appropriately authorized. User name and password are widely used as the main authentication mechanism. However, password-based authentication is not scalable and suffers from password cracking vulnerability. This disclosure describes an enhanced user authentication scheme which is customized for regulating access to traceback service in a cloud-based traceback system.

In one embodiment, a token-based authentication framework in cloud-based traceback is provided. An adversary may attempt to acquire traceback information for ill intentions. Examples of adversary are potential attackers or competitors who wish to retrieve such information for ISPs topology discovery. An adversary may use traceback techniques to invade Internet user's privacy such as tracing users who have visited certain websites. An adversary may launch DoS attacks to the traceback system. The design goal of the token-based authentication framework in cloud-based traceback is to ensure that the individual requesting for the traceback service is an actual recipient of the packet flow to be traced. This may prevent users with malicious intents from retrieving traceback information that is not supposed to be released to them. However, for privileged entities such as law enforcement investigators, this design goal may not be applicable. User authentication may also prevent denial of service attacks. The solution may be lightweight, robust, and affecting as little routers and routing protocols as possible.

Figure 4:
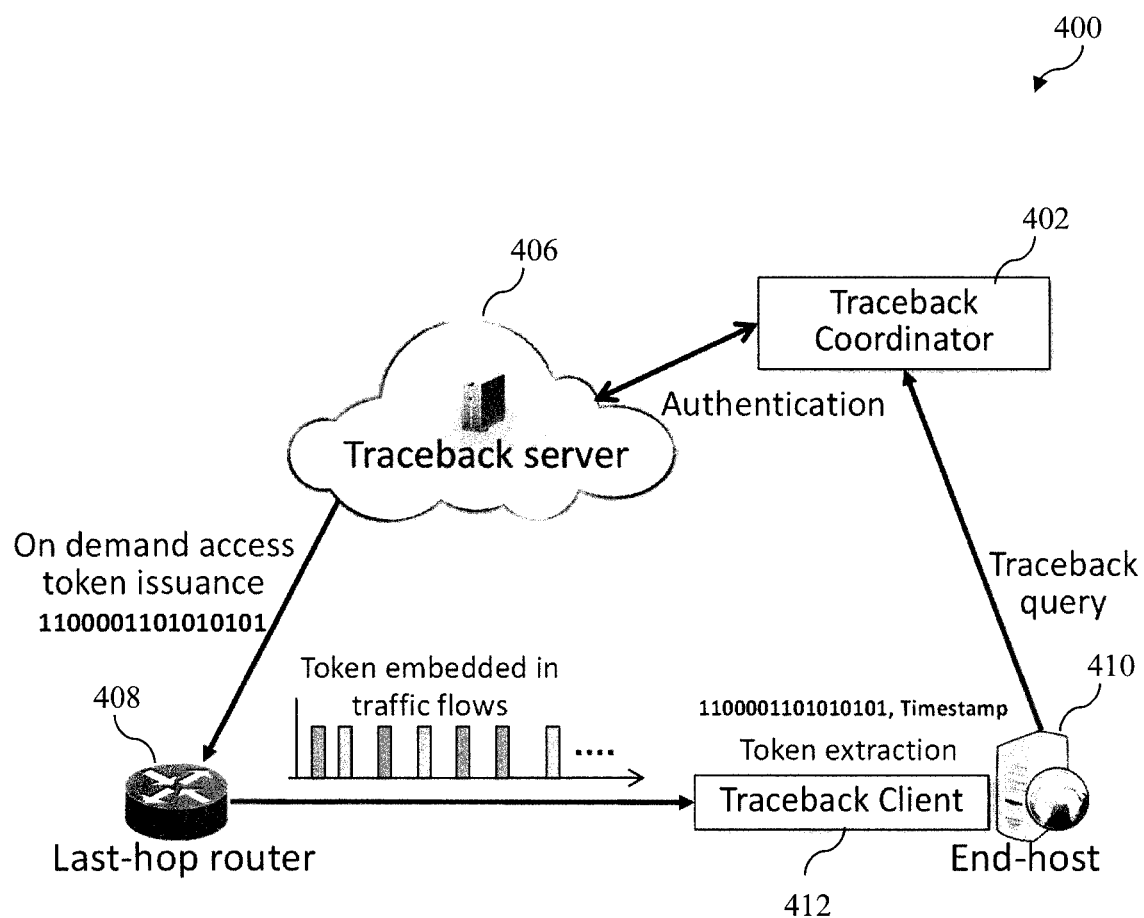
FIG. 4 is a diagram illustrating an example of a framework for authentication in cloud-based IP traceback.

Instead of authenticating with username and password for protected resources, a user may obtain a time-limited token, and use this token for authentication. FIG. 4 is a diagram 400 illustrating an example of a framework for authentication in cloud-based IP traceback. In this example, an access token is associated with a valid period, where an entity in possession of an access token is granted to retrieve traffic flow data of that specific period. A traceback server 406 may want to distribute temporal access tokens to end-hosts (e.g., end-host 410) who are indeed the intended recipients of packets to be traced. The issuance of access tokens may be triggered on-demand by intrusion detection systems, or by end-users (e.g., traceback client 412) who subscribe to traceback service and may retrieve the traceback logs later. For example, an intrusion detection system detects potential anomalies, and thus triggers the traceback server 406 to issue access tokens to the end-host 410. If it is indeed a DoS attack, it is likely the victim (e.g., the end-host 410 or the traceback client 412) may need to collect traceback information as forensic evidence so as to prosecute the perpetrators. The end-host 410 could also pass obtained access tokens to some other trusted entities such as law enforcement agency to conduct forensic investigation.

As shown in FIG. 4, a last-hop router 408 may take on the role of passing tokens to end-hosts (e.g., the end-host 410). In one embodiment, traffic flow may be used to carry access tokens to end-hosts, without incurring extra message overhead. This may ensure the access token to be known to the actual recipients of the packet flow, while malicious users may be unlikely to obtain the token. The actual recipients of the packet flow may want to retrieve the flow information later for forensic analysis in a cloud-based traceback system. Since the access token varies temporally and spatially, even if an adversary manages to intercept a token, it may be difficult for the adversary to impersonate a legitimate end-host all the time.

The traceback client 412 may be located at the end-host 410. The traceback client 412 may be in charge of the token extraction from incoming marked packets, and may store the reconstructed access tokens for further use. The traceback client 412 may be considered a black box, hiding the actual implementation from the end-host 410. An end-host with a valid access token may retrieve the corresponding traceback information through the cloud-based traceback system.

It may be desirable to transmit a token to end-hosts in an efficient and robust manner after the token is issued by the traceback server (e.g., the traceback server 406) in an AS. In one embodiment, the token may be written in IP packet header, so that end-host may obtain the token when receiving the marked packets. This approach may be referred to as direct marking. However, the available marking space in IP header is rather limited. For example, most packet marking methods have suggested using the 16-bit identification (ID) field, but RFC 6864 prohibits any such use. The length of an access token may need to be sufficiently large to make it hard to guess. In an alternative embodiment, the network flow watermarking technique may be employed. The network flow watermarking technique may attempt to manipulate the statistical properties of a flow of packets to insert the token into network flow. Unfortunately, the watermarking-based approach may introduce significant delays to the traffic flow, and may suffer from low robustness and severe decoding errors. Since tokens to be delivered to end-hosts are used for authentication and validation, accuracy and robustness are of paramount importance in token delivery.

Therefore, it may be desirable to adapt to the limited marking space in IP header for efficient token delivery. If there is a full bitwise match between certain packet fields and the token (i.e., the bit values in specific packet fields and the token are entirely equivalent), a minimum of 1-bit flag may be needed to mark the packet to indicate that it contains the token. However, the likelihood of such an occurrence is very rare. Suppose the token has a size of 64 bits, and the bit values in a packet are random variables, the chances of a full match may be as low as 1/264. In addition, using one packet to deliver a token may be vulnerable to packet drop attacks.

In one embodiment, an efficient token delivery scheme is used to spread a token across a wide spectrum of packets. This design makes the token difficult to be captured, thus reducing the risk that attackers launch packet dropping attacks, while minimizing the bit space per packet required for marking. In such an embodiment, a token may be partitioned into a sequence of non-overlapping fragments. Give an IP packet at the last-hop router (e.g., the last-hop router 408), certain field (or hash values of particular attributes) of the IP packet may be checked to determine whether this packet "matches" any fragment of the token that is to be delivered to an end-host (e.g., the end-host 410). If there is a match, the packet may be marked to notify the end-host that the packet carries partial information of the token. When the end-host receives a marked packet, the end-host may extract the partial token information embedded in the received packet. Given a collection of marked packets, the end-host may be able to reconstruct the complete access token.

Since an access token is essentially a random bit string, attributes in IP packet header with the largest variance may be identified for token fragment match. Both the 16-bit checksum field and identification field in IPv4 header may have pronounced differentiated values compared with other fields. Since the token fragment match is only performed at the last-hop router after the checksum is recalculated, the checksum will not be modified when the packet arrives at the end-host. Therefore, both checksum and identification fields may be used for embedding partial token information. Note that using the hash values of IP packet's particular attributes for token fragment match is also viable. In this case, the last-hop router and traceback client at the end-host may need to have the same hash functions. For illustration purpose, the checksum field is selected for token fragment match to describe the marking procedure in FIGS. 5-10 below. However, one of ordinary skill in the art would recognize that the identification field or hash values of particular attributes of IP packet may also be used for token fragment match.

Figure 5:
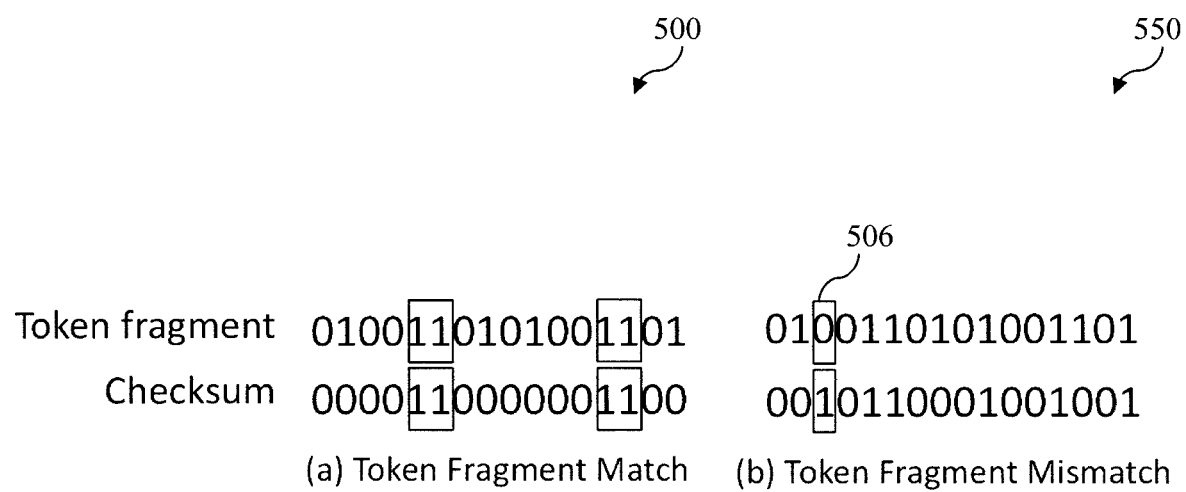
FIG. 5 shows a diagram illustrating an example of the token fragment match and a diagram illustrating an example of token fragment mismatch.

FIG. 5 shows a diagram 500 illustrating an example of the token fragment match and a diagram 550 illustrating an example of token fragment mismatch. As illustrated in FIG. 5, the size of a token fragment (TF) is assumed to be 16-bit. In one embodiment, a checksum matches the TF if the checksum retains all cleared bits (e.g., the bits with value '0') in the TF and also retains a non-empty subset of set bits (e.g., the bits with value '1') of the TF. In the diagram 500, the checksum retains all cleared bits in the TF and a non-empty subset of set bits of the TF. In the diagram 550, the checksum in an IP packet fails to retain all cleared bits in the TF. For example, at bit position 506, the value in TF is '0', which is a cleared bit, but the value in the checksum is '1'. Therefore, the checksum does not match with the TF.

According to the definition of token fragment match described above, the probability of token fragment match is highly dependent on the percentage of cleared bits in the token. For example, given a 16-bit token fragment with 50% cleared bits (i.e., 8 cleared bits) and assuming the checksum has random distribution of values, the match probability is $1/2^8$. This low probability may lead to poor performance of the token delivery. The smaller a token fragment, the higher the expected match probability. But decreasing the size of token fragment will increase the marking space requirement and the number of marked packets. There is an inherent trade-off between the match probability and the required marking space.

Without loss of generality, an access token is assumed to be partitioned into n non-overlapping fragments. Let f (f<=16) denote the length of each token fragment. Since the checksum of an IPv4 header is 16-bit, when f<16, f bits of the checksum value is used for token fragment match. Suppose there are k (k>=n) bits marking space in an IP header that can be used to encode information for token delivery at the last-hop router. For simplicity, 8-bit long token fragment is used to describe the token delivery design of some embodiments, where f can also be set to different values. In this case, the checksum value may be split into 2 equal 8-bit portions, which are called the upper checksum and the lower checksum, respectively. In order to minimize the marking space requirement and improve the marking efficiency, the 8-bit upper checksum may be used for token fragment match. As a result, only 1 bit is used for each token fragment to indicate a match or a mismatch with the specified checksum value.

Figure 6:
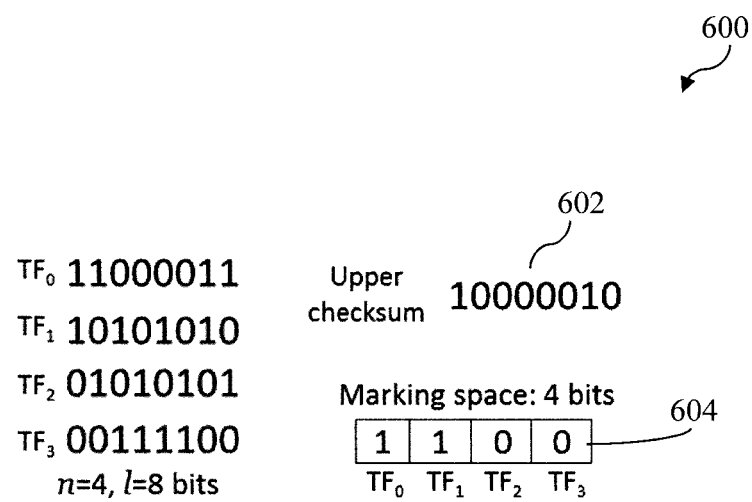
FIG. 6 is a diagram illustrating an example of using 8-bit upper checksum for token fragment match.

FIG. 6 is a diagram 600 illustrating an example of using 8-bit upper checksum 602 for token fragment match. In this example, the token length is assumed to be 32-bit and the marking space 604 is assumed to be 4-bit, where the marking space 604 is used to indicate token fragment match.

In one embodiment, given a checksum value when the last-hop router receives a packet, the upper checksum 602 may be checked for any token fragment match by traversing down the token fragments (e.g., $TF_0$-$TF_3$). Since the first token fragment $TF_0$ matches with the upper checksum 602, the first bit in the marking field 604 is set to "1". Similarly, since the upper checksum 602 matches with $TF_1$, the marking value of the second bit in the marking field 604 is set to "1". Since the upper checksum 602 does not matches with $TF_2$ and $TF_3$, the marking values of the third and fourth bits in the marking field 604 are set to "0". Finally, the marking value "1100" is obtained in this example. Note that all packets to the end-host, regardless of whether they are suspicious or not, may be used for marking, resulting in a fast and efficient token delivery.

Note that the design of some embodiments may be easily extended to adapt to available marking space in IP header. For the example in FIG. 6, if the IP header has 8 bits for marking, two bits may be used for each token fragment to indicate the usage of the upper or lower checksum. That is, "00" denotes there is no token fragment match neither with the upper checksum nor lower checksum, "10" denotes the token fragment match with the upper checksum, "01" denotes the token fragment match with the lower checksum, and "11" denotes the match with both. This operation increases the token fragment matching ratio and thus further improves the token delivery efficiency.

If the last-hop router simply marks all the packets that match any token fragment, such simple marking scheme may be referred to as the "blind marking". One drawback of the blind marking is that, since the last-hop router does not keep track of the portions of the token that has been relayed to an end-host, it has to be executed throughout a specified time period without knowing whether an access token has been fully matched or not. Moreover, when a partial token has already been formed at the end-host, the blind marking may result in marked packets carrying redundant information to the end-host. To minimize the marking overhead, the idea of concise marking may be used in some embodiments.

Figure 7:
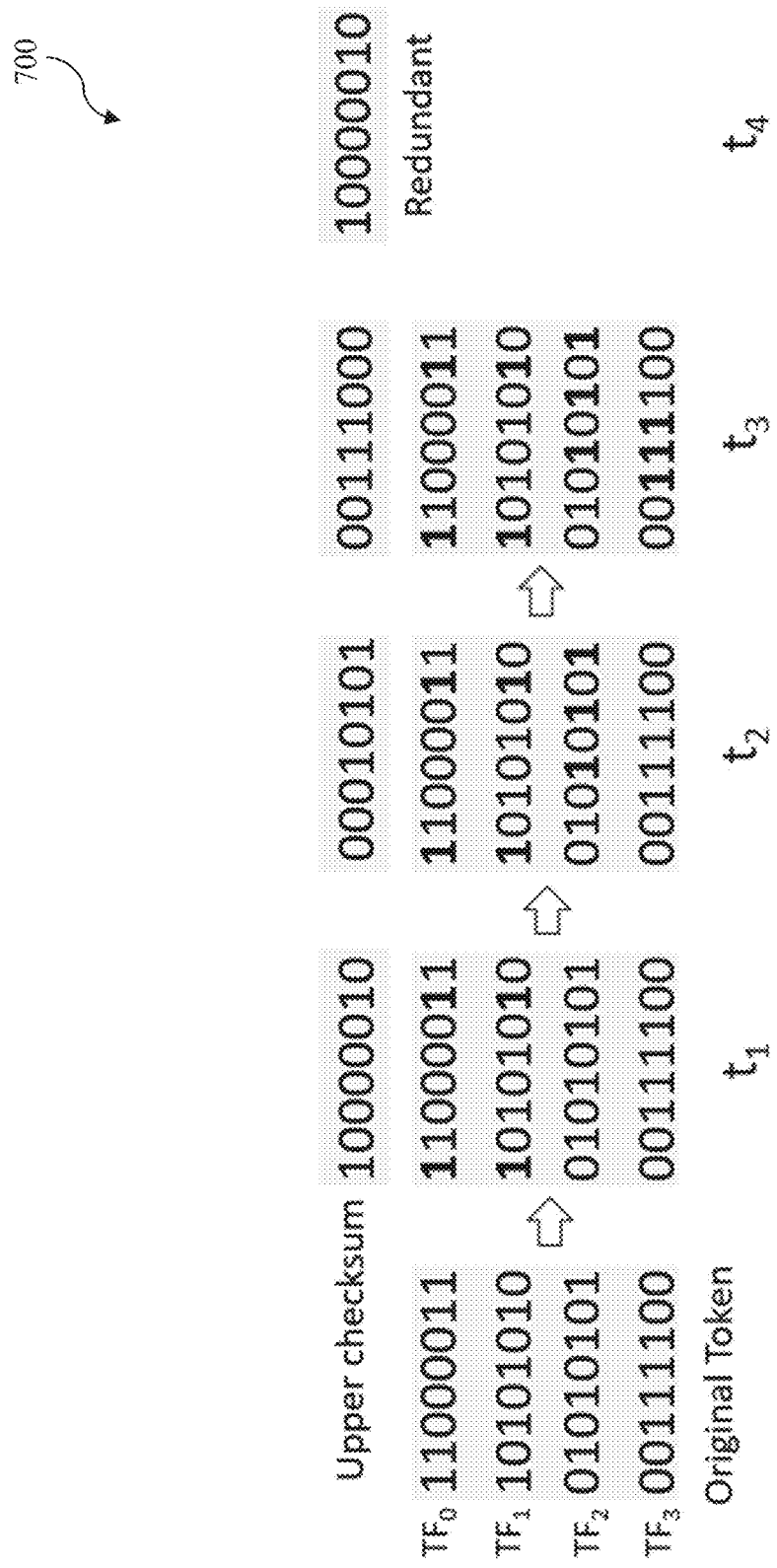
FIG. 7 is a diagram illustrating an example of the last-hop router keeping track of the token delivery progress to an end-host.

In some embodiments, whenever the last-hop router finds a token fragment match, the last-hop router may mark the packets and take note on which bit values have been relayed to the end-host. FIG. 7 is a diagram 700 illustrating an example of the last-hop router keeping track of the token delivery progress to an end-host. In this example, the last-hop router may mark a packet if and only if the packet can carry new set bit values to the end-host. For example, at time $t_1$, since $TF_0$ and $TF_1$ find token fragment matches with the upper checksum, the last-hop router updates their remaining set bits as "01000001" and "00101000", respectively. At time $t_2$, the remaining set bits of $TF_2$ are updated as "01000000". Later at time $t_3$, the remaining set bits of $TF_3$ are updated as "00000100". However, at time $t_4$, since the last-hop router finds a redundant token fragment match, the last-hop router may not perform the packet marking.

FIG. 8 is a diagram 800 describing an algorithm with regard to the concise marking-based token delivery in one embodiment. Suppose there is an access token to be delivered to an end-host, when the last-hop router receives a packet, the last-hop router first extracts the upper checksum (lines 3-4). Then, for all token fragments, the last hop router sequentially checks whether there is a concise token fragment match. If yes, the marking filed is updated and then embedded in the packet's IP header (lines 6-13). The benefit of concise marking includes the reduction of redundant packets to be marked. In this way, the maximum number of packets to be marked would be the number of set bits that the token has. The concise marking-based token delivery also provides an end point to the token delivery. When the entire token has been relayed to the end-host, there will be no need to mark any further packets, ending the token delivery process (lines 14-16).

FIG. 9 is a diagram 900 describing the function of checking concise token fragment match. As illustrated, the function first makes sure there is a token fragment match (lines 2-4). Then, the function checks any new bit can be conveyed by the selected attribute (e.g., upper checksum). Finally, the remaining set bits of each token fragment are updated (line 10).

The traceback client deployed at the end-host may be in charge of the token extraction. The last-hop router may use a preamble to notify the traceback client at the end-host that a new access token has been issued. For example, all bits may be set in the marking field to indicate a preamble. In this case, the last-hop router may neglect the matching case with all marking bits set. It is a viable solution and affects the performance insignificantly since the probability of all token fragments match an upper checksum is extremely low. When the traceback client receives a token delivery preamble, it may generate a token instance with all bits cleared. Upon receiving a marked packet, the traceback client may update the temporal token. Since the last-hop router keeps track of the token fragment delivery progress in concise marking, the last-hop router may send out a postamble to end the token delivery once the entire token has been relayed to the end-host. After receiving a certain number of marked packets, the full access token may be recovered at the end-host.

Figure 10:
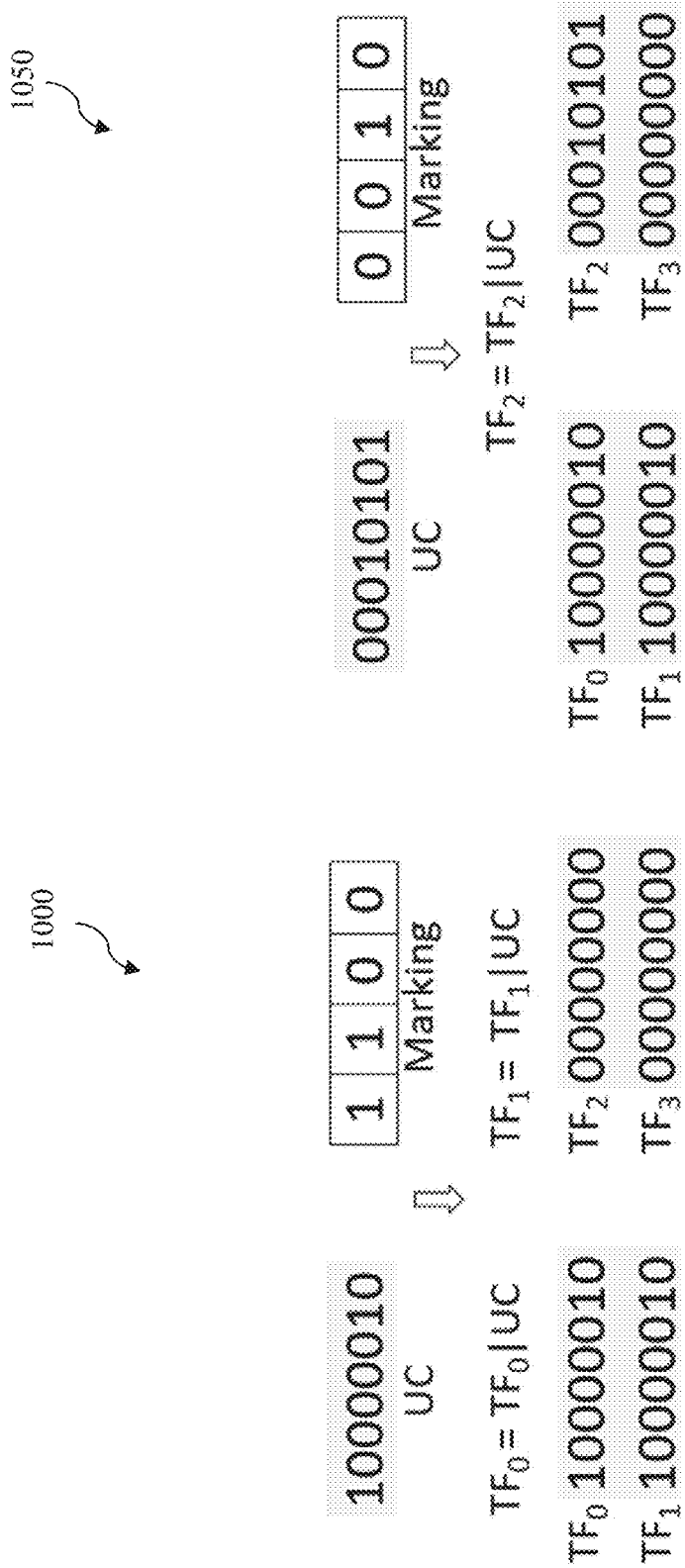
FIG. 10 shows diagrams illustrating an example of a token extraction procedure corresponding to the token fragment match example described above in FIG. 6.

FIG. 10 shows diagrams 1000 and 1050 illustrating an example of a token extraction procedure corresponding to the token fragment match example described above in FIG. 6. As illustrated in diagram 1000, the end-host (or traceback client) may decode the marking "1100" when receiving the first marked packet, in which the upper checksum (UC) is "10000010". Because the marking indicates that $TF_0$ and $TF_1$ contain partial information of the token, the end-host (or traceback client) may then update the token with $TF_0=TF_0|UC$ and $TF_1=TF_1|UC$, where "|" denotes the bitwise OR operator. As illustrated in diagram 1050, after receiving the second marked packet, in which the marking is "0010" and the upper checksum being "00010101", the end-host (or traceback client) may update the token with $TF_2=TF_2|UC$, as the marking indicates that $TF_2$ contains partial information of the token. Note that to reconstruct a new access token, the traceback client does not need to store the marked packets. It only needs to maintain a token instance in the buffer, and keeps updating the token when receiving marked packets until a postamble is received.

As mentioned, the traceback processing in existing logging-based traceback solutions applies the hop-by-hop flooding to upstream ASes procedures, thus suffering from low query efficiency and poor scalability. Conversely, some embodiments of this disclosure achieve efficient traceback processing by avoiding the traceback query flooding.

In the examples described above, the reasons why traditional IP traceback solutions have limited practical deployment have been discussed. An embodiment of cloud-based traceback architecture is presented, which exploits increasingly available cloud infrastructures for logging traffic digests to implement forensic traceback. Such cloud-based traceback simplifies the traceback processing and makes traceback service more accessible. The cloud-based traceback not only possesses privacy-preserving and incremental deployment properties, but also shows strong immunity to attacks and high financial motivation. A marking scheme of some embodiments is further described to improve the traceback processing performance and incremental deployability over the cloud-based traceback framework. In a further embodiment, an enhanced user authentication framework is described. The enhanced user authentication framework may ensure that the individual requesting for the traceback procedure is an actual recipient of the flow packets to be traced.

Figure 11:
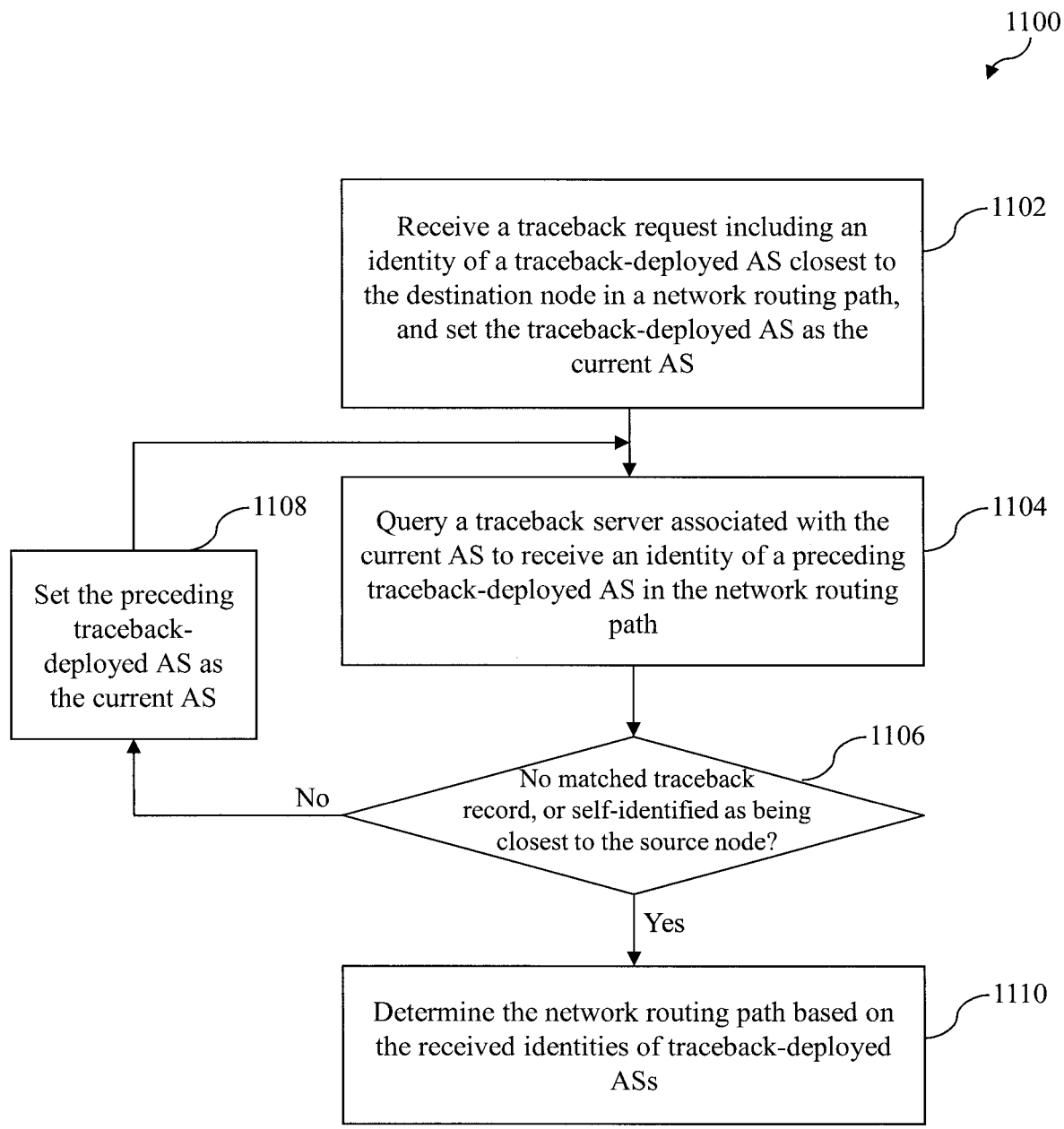
FIG. 11 is a flowchart of a method of IP tracking.

FIG. 11 is a flowchart 1100 of a method of IP tracking. In one embodiment, the method may perform operations described above with reference to FIG. 3. The method may be performed by a traceback coordinator (e.g., the traceback coordinator 302). At 1102, the traceback coordinator may receive a traceback request including an identity of a traceback-deployed AS closest to the destination node in a network routing path, and set the traceback-deployed AS as the current AS.

In one embodiment, the traceback request may further include an access token. The traceback coordinator may further authenticate, via the traceback server associated with the traceback-deployed AS closest to the destination node, the traceback request based on the access token. In one embodiment, the access token may be associated with a valid period for the IP traceback. In one embodiment, the access token may be issued by the traceback server associated with the traceback-deployed AS closest to the destination node.

At 1104, the traceback coordinator may query a traceback server associated with the current AS to receive an identity of a preceding traceback-deployed AS in the network routing path. In one embodiment, a traceback server may be deployed in each traceback-deployed autonomous system. Traffic flow information collected at traceback-enabled routers within a traceback-deployed autonomous system may be exported to a cloud storage managed by a traceback server associated with the traceback-deployed autonomous system. In one embodiment, the traffic flow information may include an immediate upstream traceback-deployed autonomous system of a traffic flow routed to the traceback-deployed autonomous system. The preceding traceback-deployed autonomous system may be determined based on the traffic flow information.

At 1106, the traceback coordinator may determine whether there is no matched traceback record on the trackback server being queried, or the traceback server being queried identifies an associated traceback-deployed AS as being closest to the source node in the network routing path. If there is no matched traceback record on the trackback server being queried, or the traceback server being queried identifies an associated traceback-deployed AS as being closest to the source node in the network routing path, the traceback coordinator may proceed to 1110. Otherwise, the traceback coordinator may proceed to 1108.

At 1108, the traceback coordinator may set the preceding traceback-deployed AS as the current AS. This will allow the traceback coordinator to recursively query the traceback-deployed ASes along the reverse path of the network routing path. The traceback coordinator may then loop back to 1104 to recursively query the next traceback server associated with the current AS. In one embodiment, the recursively querying operations at 1104, 1106, and 1108 may be performed if the traceback request is authenticated.

At 1110, the traceback coordinator may determine the network routing path based on the received identities of the traceback-deployed ASes. The identities of the traceback-deployed ASes may be received by the operations performed at 1102 and 1104.

In one embodiment, an apparatus for IP traceback is provided. The apparatus may include a memory and at least one processor coupled to the memory. The at least one processor may be configured to receive a traceback request including the identity of a traceback-deployed autonomous system closest to the destination node in a network routing path. The at least one processor may be configured to recursively query a traceback server associated with the traceback-deployed autonomous system to receive the identity of a preceding traceback-deployed autonomous system in the network routing path. The traceback server associated with the preceding traceback-deployed autonomous system is to be queried in the next iteration of the recursively querying. The at least one processor may be configured to determine the network routing path based on the received identities of traceback-deployed autonomous systems.

In one embodiment, the at least one processor may be further configured to terminate the recursively querying when there is no matched traceback record on the traceback server being queried or the traceback server being queried identifies an associated traceback-deployed autonomous system as being closest to the source node in the network routing path. In one embodiment, the traceback request may further include an access token. In such an embodiment, the at least one processor may be further configured to authenticate, via the traceback server associated with the traceback-deployed autonomous system closest to the destination node, the traceback request based on the access token. The recursively querying may be performed when the traceback request is authenticated.

Figure 12:
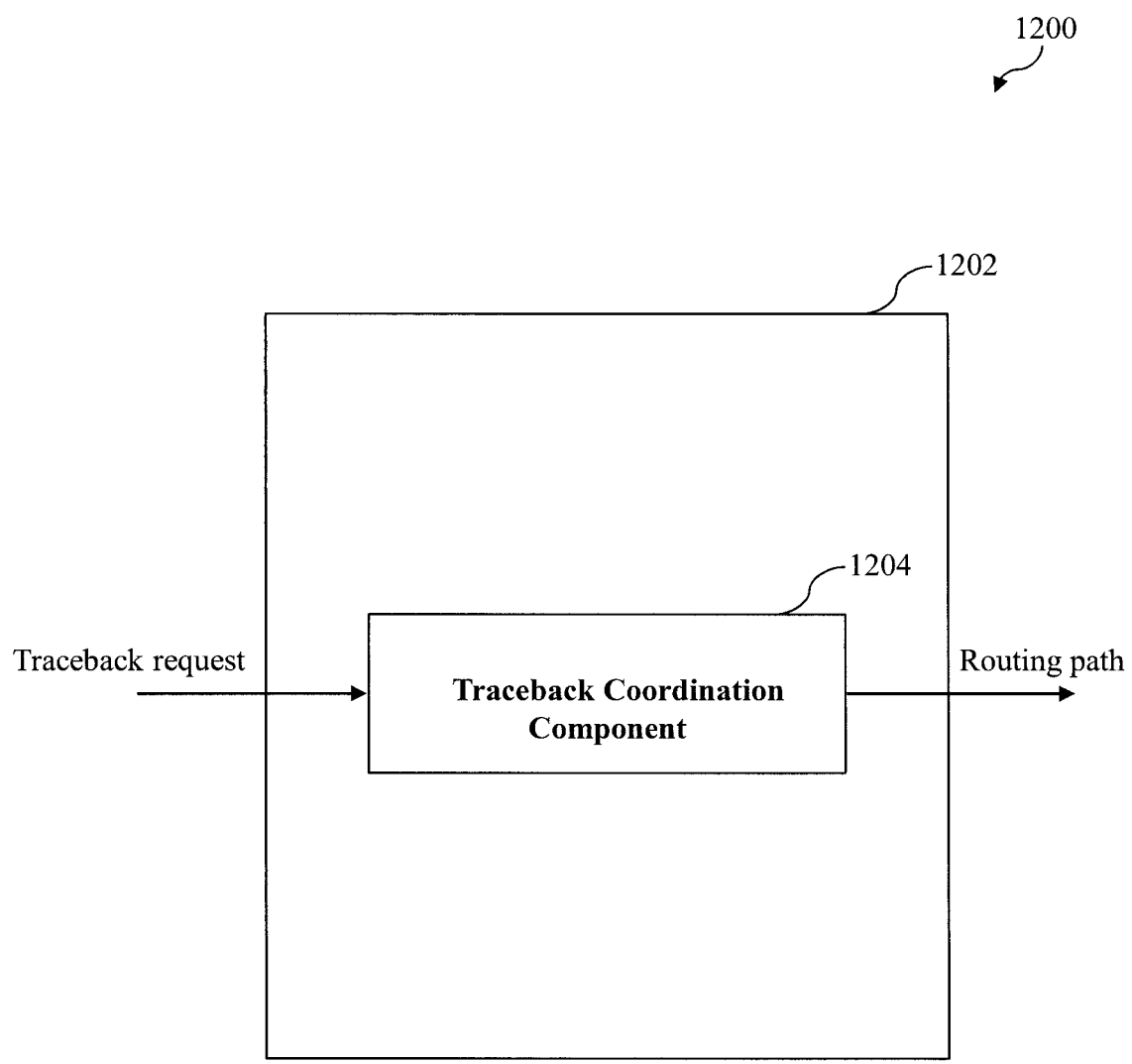
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus 1202 may be a traceback coordinator. The apparatus 1202 may include a traceback coordination component 1204.

The traceback coordination component 1204 may receive a traceback request and determine a routing path in response to the traceback request. In one configuration, the traceback coordination component 1204 may perform the operations described above with reference to FIG. 11.

The apparatus 1202 may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
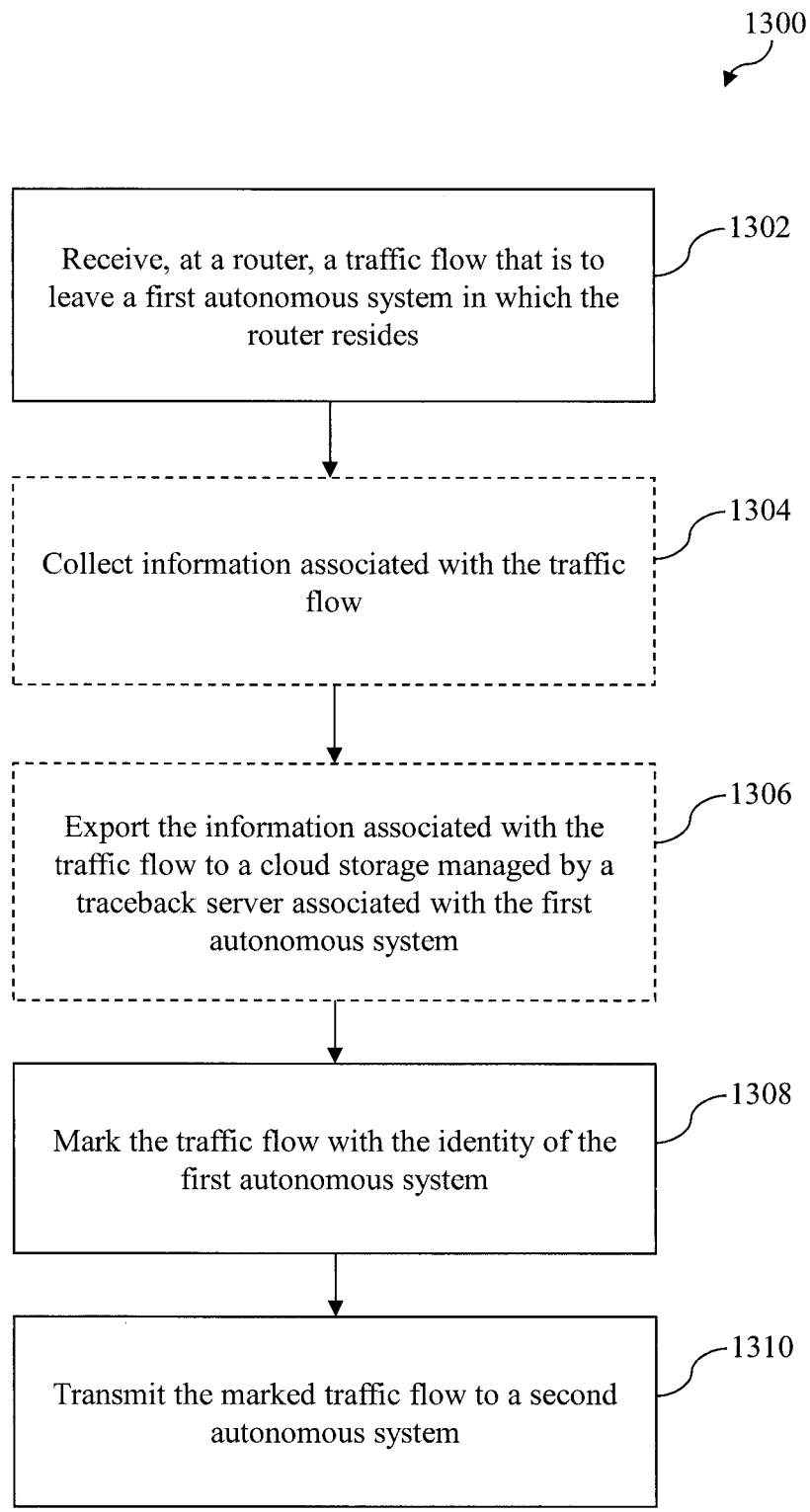
FIG. 13 is a flowchart of a method of traffic flow marking for IP tracking.

FIG. 13 is a flowchart 1300 of a method of traffic flow marking for IP tracking. In one embodiment, the method may perform operations described above with reference to FIGS. 1 and 2. The method may be performed by a traceback-enabled router. At 1302, the router may receive a traffic flow that is to leave a first autonomous system in which the router resides.

At 1304, the router may optionally collect information associated with the traffic flow. In one embodiment, the information associated with the traffic flow may include the identity of a third autonomous system preceding the first autonomous system in the network routing path of the traffic flow.

At 1306, the router may optionally export the information associated with the traffic flow to a cloud storage managed by a traceback server associated with the first autonomous system.

At 1308, the router may mark the traffic flow with the identity of the first autonomous system. In one embodiment, to mark the traffic flow, the router may overwrite the identity of the third autonomous system in the traffic flow with the identity of the first autonomous system.

At 1310, the router may transmit the marked traffic flow to a second autonomous system.

In one embodiment, an apparatus for IP traceback is provided. The apparatus may include a memory and at least one processor coupled to the memory. The at least one processor may be configured to receive a traffic flow that is to leave a first autonomous system in which the apparatus resides. The at least one processor may be configured to mark the traffic flow with the identity of the first autonomous system. The at least one processor may be configured to transmit the marked traffic flow to a second autonomous system.

In one embodiment, the at least one processor may be further configured to collect information associated with the traffic flow. The at least one processor may be further configured to export the information associated with the traffic flow to a cloud storage managed by a traceback server associated with the first autonomous system.

In one embodiment, the information associated with the traffic flow may include the identity of a third autonomous system preceding the first autonomous system in a network routing path of the traffic flow. To mark the traffic flow, the at least one processor may be configured to overwrite the identity of the third autonomous system in the traffic flow with the identity of the first autonomous system.

Figure 14:
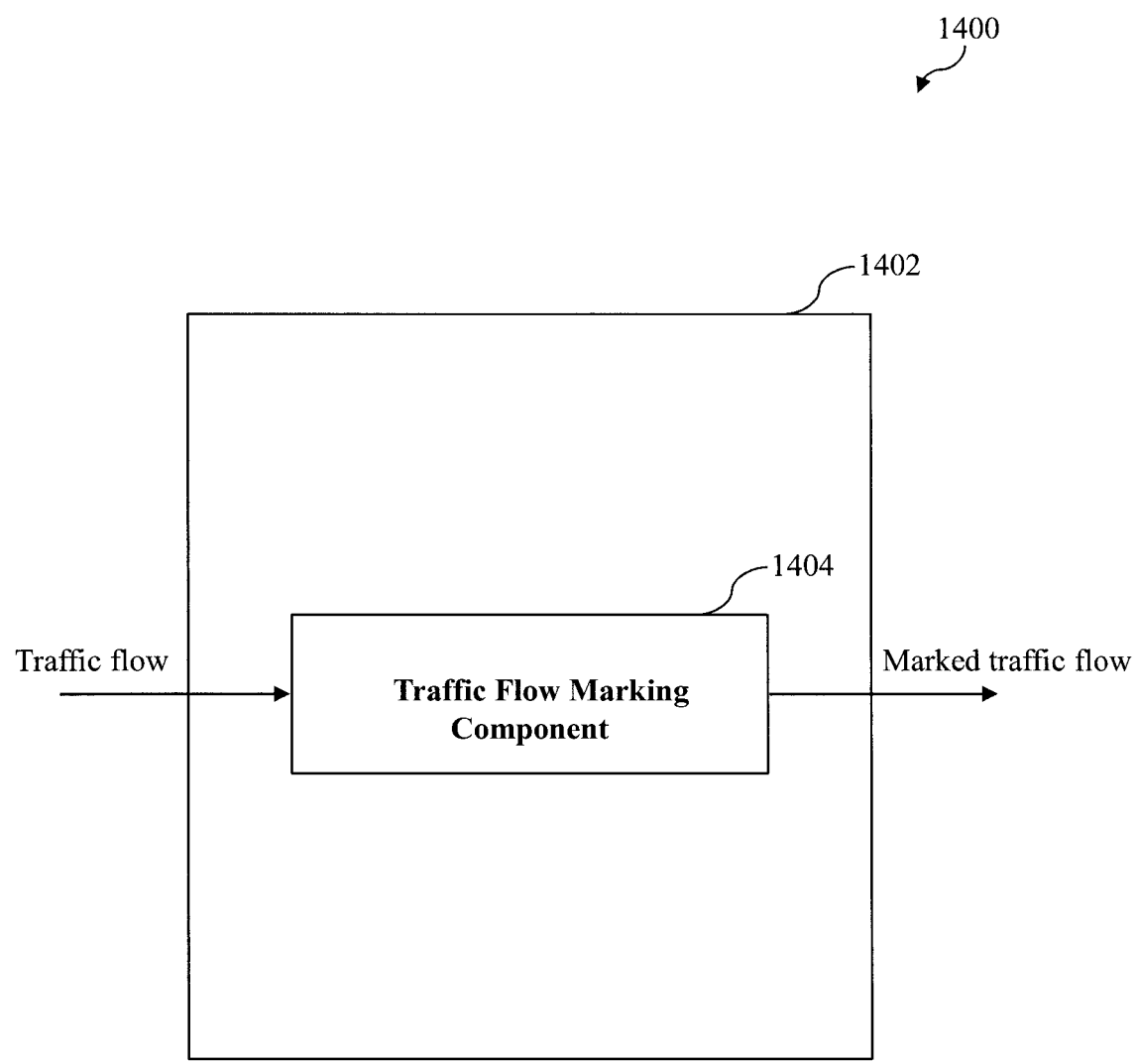
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus 1402 may be a traceback-enabled router. The apparatus 1402 may include a traffic flow marking component 1404.

The traffic flow marking component 1404 may receive a traffic flow and mark the traffic flow with the identity of the AS in which the apparatus 1402 resides. In one configuration, the traffic flow marking component 1404 may perform the operations described above with reference to FIG. 13.

The apparatus 1402 may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
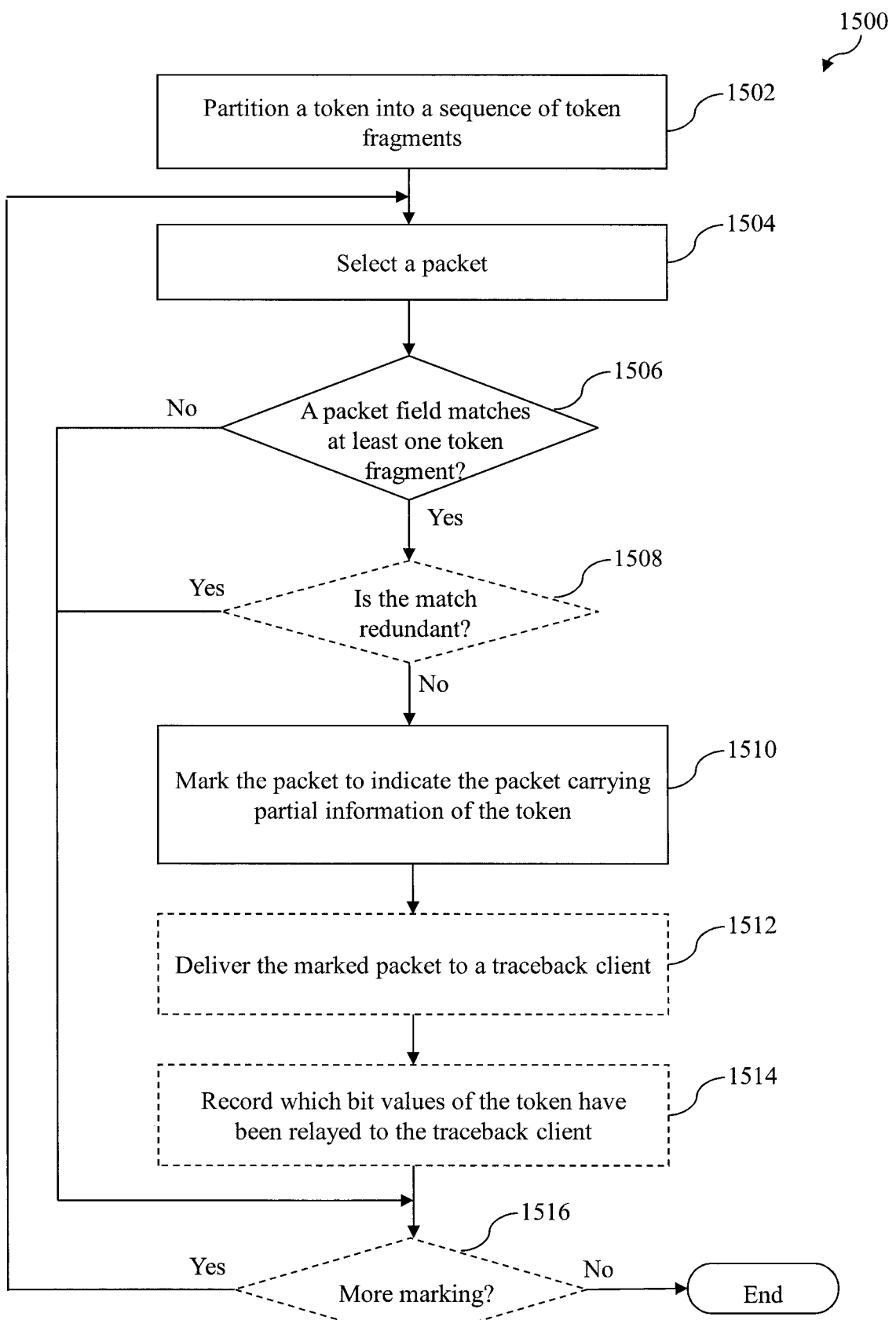
FIG. 15 is a flowchart 1500 of a method of access token delivery.

FIG. 15 is a flowchart 1500 of a method of access token delivery. In one embodiment, the method may perform operations described above with reference to FIGS. 4-10. The method may be performed by a last-hop router (e.g., the last-hop router 408). At 1502, the router may partition a token into a sequence of token fragments. In one embodiment, the sequence of token fragments may be non-overlapping. In one embodiment, the token may be associated with a valid period for IP traceback.

At 1504, the router may select a packet.

At 1506, the router may determine whether a packet field of the packet matches at least one token fragment. If a packet field of the packet matches at least one token fragment, the router may proceed to 1508. Otherwise, the router may proceed to 1516. In one embodiment, the packet field may be one of the checksum field, the identification field, or hash values of the packet's particular attributes. In one embodiment, the packet field matches a token fragment when the field retains cleared bits and a non-empty subset of set bits of the token fragment.

At 1508, the router may optionally determine whether the match identified at 1506 above is redundant. If the match is redundant, the router may proceed to 1516. Otherwise, the router may proceed to 1510.

At 1510, the router may mark the packet to indicate the packet carrying partial information of the token.

At 1512, the router may optionally deliver the marked packet to a traceback client. In one embodiment, the traceback client may extract the partial information of the token from the marked packet. The traceback client may reconstruct the token based on a collection of partial information of the token extracted from a plurality of marked packets.

At 1514, the router may optionally record which bit values of the token have been relayed to the traceback client.

At 1516, the router may optionally determine whether more marking of the packets is needed for the token delivery, e.g., based on the record made at 1514. If more marking of the packets is needed, the router may loop back to 1504 to select a new packet. Otherwise, the router may terminate the method.

In one embodiment, an apparatus for token delivery is provided. The apparatus may include a memory and at least one processor coupled to the memory. The at least one processor may be configured to partition a token into a sequence of token fragments. The at least one processor may be configured to determine whether a field of a packet matches at least one token fragment of the sequence of token fragments. The at least one processor may be configured to mark the packet to indicate the packet carrying partial information of the token when the field of the packet matches at least one token fragment of the sequence of token fragments.

In one embodiment, the at least one processor may be further configured to deliver the marked packet to a traceback client. The traceback client may extract the partial information of the token from the marked packet.

In one embodiment, the at least one processor may be further configured to record which bit values of the token have been relayed to the traceback client. The at least one processor may be further configured to determine whether a match between the field and a token fragment provides redundant information to the traceback client. The at least one processor may be further configured to prevent the packet from being marked when the match between the field and the token fragment provides redundant information.

Figure 16:
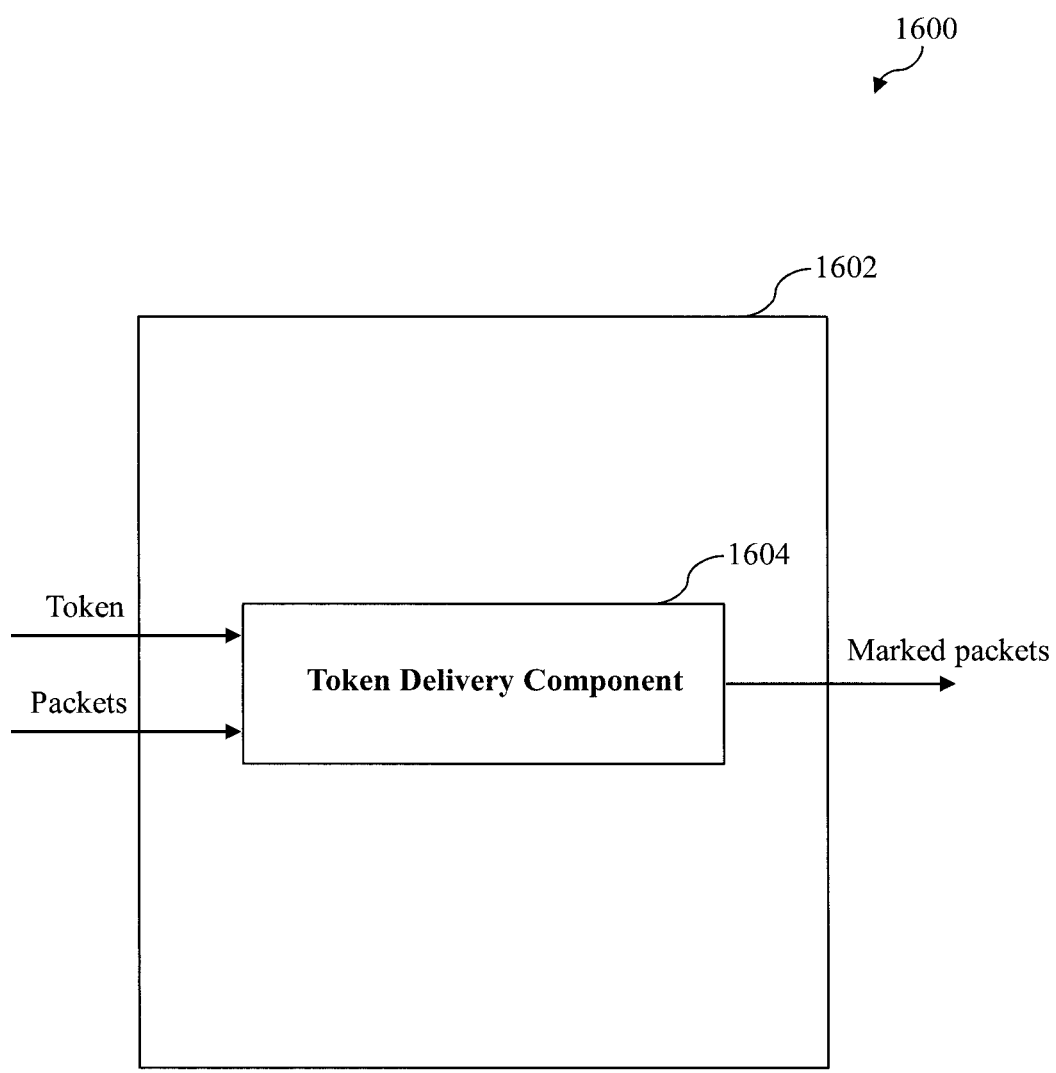
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus 1602 may be a last-hop router. The apparatus 1602 may include a token delivery component 1604.

The token delivery component 1604 may receive an access token and a plurality of packets, and mark some of the packets to indicate the conveyance of partial information of the access token. In one configuration, the token delivery component 1604 may perform the operations described above with reference to FIG. 15.

The apparatus 1602 may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
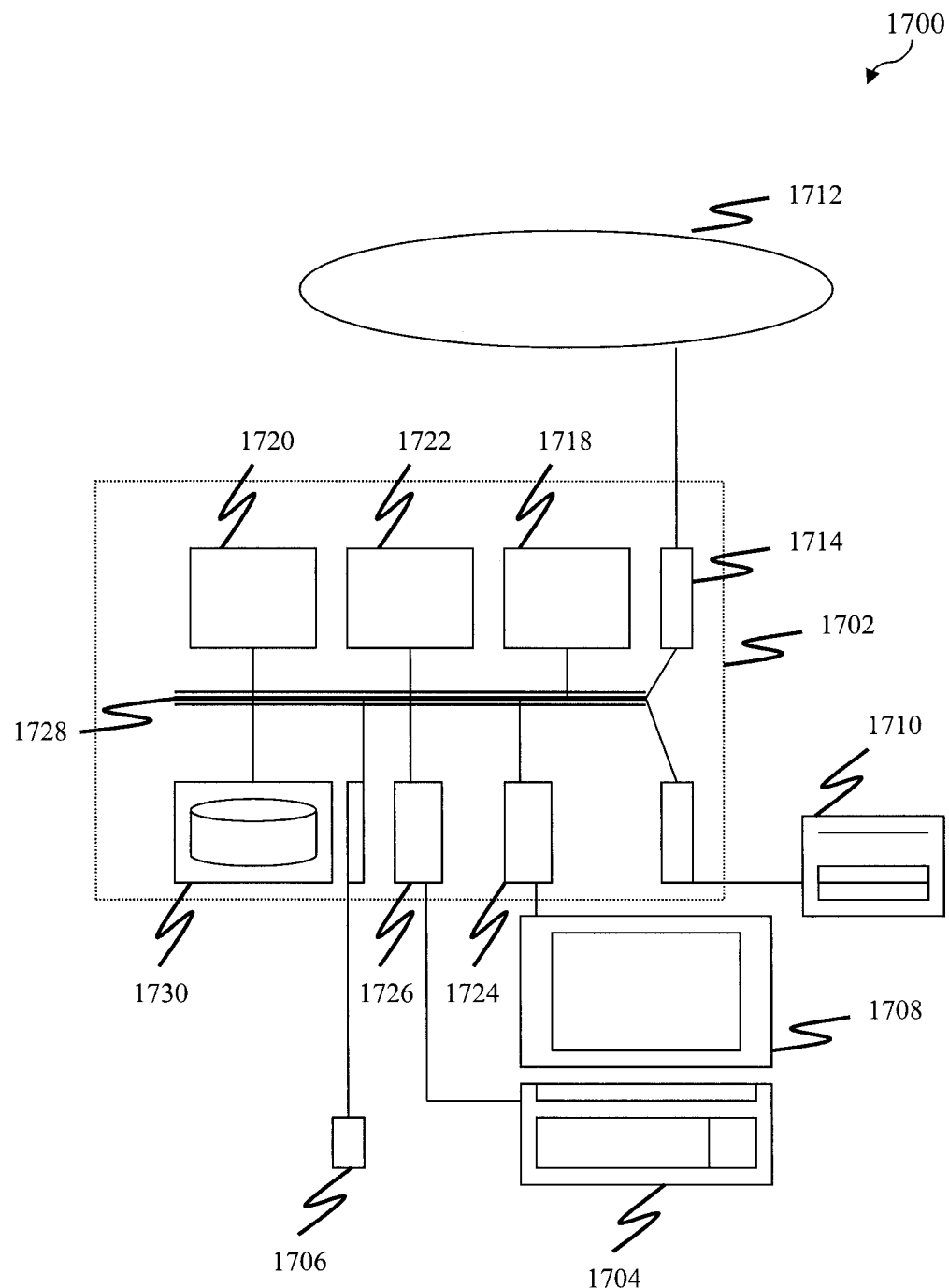
FIG. 17 depicts a schematic drawing of an exemplary computer system.

The methods or functional modules of the various example embodiments as described hereinbefore may be implemented on a computer system, such as a computer system 1700 as schematically shown in FIG. 17 as an example only. The method or functional module may be implemented as software, such as a computer program being executed within the computer system 1700, and instructing the computer system 1700 to conduct the method of various example embodiments. The computer system 1700 may include a computer module 1702, input modules such as a keyboard 1704 and mouse 1706 and a plurality of output devices such as a display 1708, and a printer 1710. The computer module 1702 may be connected to a computer network 1712 via a suitable transceiver device 1714, to enable access to e.g. the Internet or other network systems such as Local Area Network (LAN) or Wide Area Network (WAN). The computer module 1702 in the example may include a processor 1718 for executing various instructions, a Random Access Memory (RAM) 1720 and a Read Only Memory (ROM) 1722. The computer module 1702 may also include a number of Input/Output (I/O) interfaces, for example I/O interface 1724 to the display 1708, and I/O interface 1726 to the keyboard 1704. The components of the computer module 1702 typically communicate via an interconnected bus 1728 and in a manner known to the person skilled in the relevant art.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "ABC or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of Internet Protocol (IP) traceback for a cloud-based traceback system comprising a plurality of traceback-deployed autonomous systems and a traceback coordinator configured to operate as a central portal of access to the cloud-based traceback system with respect to traceback querying, the method comprising:

receiving, by the traceback coordinator, a traceback request including an identity of a traceback-deployed autonomous system of the plurality of traceback-deployed autonomous systems closest to a destination node in a network routing path;

recursively querying, by the traceback coordinator, a traceback server associated with the traceback-deployed autonomous system to receive an identity of a preceding traceback-deployed autonomous system of the plurality of traceback-deployed autonomous systems in the network routing path, wherein a traceback server associated with the preceding traceback-deployed autonomous system is to be queried in a next iteration of the recursively querying; and determining, by the traceback coordinator, the network routing path based on the received identities of traceback-deployed autonomous systems, wherein each traceback-deployed autonomous system of the plurality of traceback-deployed autonomous systems is configured to, after receiving a traffic flow comprising an identity of an immediate upstream traceback-deployed autonomous system, store the identity of the immediate upstream traceback-deployed autonomous system therein and mark the identity of the traceback-deployed autonomous system in the traffic flow.

2. The method of claim 1, further comprising terminating the recursively querying when there is no matched traceback record on the traceback server being queried or the traceback server being queried identifies an associated traceback-deployed autonomous system of the plurality of traceback-deployed autonomous systems as being closest to a source node in the network routing path.

3. The method of claim 1, wherein the traceback request further includes an access token, wherein the method further comprises:

authenticating, via the traceback server associated with the traceback-deployed autonomous system closest to the destination node, the traceback request based on the access token, wherein the recursively querying is performed when the traceback request is authenticated.

4. The method of claim 3, wherein the access token is associated with a valid period for the IP traceback.

5. The method of claim 3, wherein the access token is issued by the traceback server associated with the traceback-deployed autonomous system closest to the destination node.

6. The method of claim 1, wherein a traceback server is deployed in each traceback-deployed autonomous system, wherein traffic flow information collected at traceback-enabled routers within a traceback-deployed autonomous system is exported to an internal cloud storage managed by a traceback server associated with the traceback-deployed autonomous system.

7. The method of claim 6, wherein the traffic flow information includes the identity of the immediate upstream traceback-deployed autonomous system of the traffic flow routed to the traceback-deployed autonomous system, wherein the preceding traceback-deployed autonomous system is determined based on the traffic flow information.

* * * * *